US012332910B2

(12) United States Patent
Buchmann et al.

(10) Patent No.: US 12,332,910 B2
(45) Date of Patent: Jun. 17, 2025

(54) METADATA ELEMENTS WITH PERSISTENT IDENTIFIERS

(71) Applicant: SAP SE, Walldorf (DE)

(72) Inventors: Daniel Buchmann, Karlsruhe (DE);
Timm Falter, Sinsheim-Hilsbach (DE);
Ralf Dentzer, Hockenheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/451,466

(22) Filed: Oct. 19, 2021

(65) Prior Publication Data

US 2023/0121287 A1 Apr. 20, 2023

(51) Int. Cl.
*G06F 16/25* (2019.01)
*G06F 16/21* (2019.01)

(52) U.S. Cl.
CPC .......... *G06F 16/258* (2019.01); *G06F 16/212* (2019.01)

(58) Field of Classification Search
CPC .... G06F 16/258; G06F 16/212; G06F 16/907; G06F 16/256
See application file for complete search history.

(56) References Cited

U.S. PATENT DOCUMENTS

| | | | | |
|---|---|---|---|---|
| 5,794,241 A * | 8/1998 | Loaiza | ................ | G06F 16/2343 |
| 6,611,838 B1 * | 8/2003 | Ignat | ..................... | G06F 16/254 |
| 8,112,738 B2 * | 2/2012 | Pohl | ...................... | G06F 40/143 |
| | | | | 717/121 |
| 9,501,556 B2 * | 11/2016 | King | ...................... | G06F 16/258 |
| 9,612,825 B2 * | 4/2017 | Feldman | ............... | G06F 16/284 |
| 2006/0218523 A1 * | 9/2006 | Tatsumi | ................. | G06F 8/355 |
| | | | | 717/106 |
| 2006/0224633 A1 * | 10/2006 | Fahmy | ...................... | G06F 8/38 |
| 2007/0220027 A1 * | 9/2007 | Richey | .................. | G06Q 10/06 |
| 2009/0119345 A1 * | 5/2009 | Davydok | ............ | G06F 9/44505 |
| 2010/0332529 A1 * | 12/2010 | Nayak | ....................... | G06F 9/54 |
| | | | | 707/812 |
| 2011/0191304 A1 * | 8/2011 | Ristow | .................... | G06F 16/00 |
| | | | | 707/752 |
| 2017/0337244 A1 * | 11/2017 | Tago | ..................... | G06F 16/164 |

OTHER PUBLICATIONS

European Search Report received in European Patent Application No. 22201246.0, dated Mar. 1, 2023, 7 pages.
Result of Consultation received in European Application No. 22201246.0, dated Feb. 25, 2025, 11 pages.

* cited by examiner

*Primary Examiner* — Cheyne D Ly
(74) *Attorney, Agent, or Firm* — Klarquist Sparkman, LLP

(57) ABSTRACT

Techniques and solutions are described for retaining names for metadata elements, such as when metadata is imported, converted to a different format, or used with a system that may have restrictions on naming different than a system on which the metadata is created. Metadata includes a plurality of metadata elements, including a first metadata element associated with a first name. A second name is received for the first metadata element. The second name is assigned to the first metadata element. An association is created between the renamed first metadata element and the first name.

20 Claims, 24 Drawing Sheets

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'
@Analytics.dataCategory: #DIMENSION
@AccessControl.authorizationCheck: #CHECK
@Metadata.allowExtensions: true
@Search.searchable: true
define view I_SampleSalesOrder                                                        ⎫
    as select from     vbak                                                           ⎪
       left outer to one join vbkd on vbak.vbeln = vbkd.vbeln                         ⎬ 704
                                  and vbkd.posnr = '000000'                           ⎪
    association [0..*] to I_SampleSalesOrderItem as _Item                     ⎫       ⎪
       on $projection.SalesOrder = _Item.SalesOrder                           ⎪       ⎪
    association [0..1] to I_SampleCurrency as _TransactionCurrency            ⎬ 720   ⎪
       on $projection.TransactionCurrency = _TransactionCurrency.Currency     ⎪       ⎪
    association [0..1] to I_SampleCustomer          as _SoldToParty           ⎪       ⎪
       on $projection.SoldToParty = _SoldToParty.Customer                     ⎭       ⎭
{
    @Search.defaultSearchElement: true                                                        ⎫
    key cast(vbak.vbeln as vdm_sales_order preserving type) as SalesOrder,    //Composition  ⎪
    @ObjectModel.association.type: [#TO_COMPOSITION_CHILD]                                    ⎪
    _Item,                                                                                    ⎪
    vbak.vkorg                                   as SalesOrganization,                        ⎪
    vbak.auart                                   as SalesOrderType,                           ⎪
    vbak.vtweg                                   as DistributionChannel,                      ⎪
    @ObjectModel.foreignKey.association: '_SoldToParty'                                       ⎬ 722
    vbak.kunnr                                   as SoldToParty,              724             ⎪
    _SoldToParty,                                                                             ⎪
    @DefaultAggregation: #SUM                                                                 ⎪
    @Semantics.amount.currencyCode: 'TransactionCurrency'                                     ⎪
    vbak.netwr                                   as TotalNetAmount,                           ⎪
    @Semantics.currencyCode: true                                                             ⎪
    @ObjectModel.foreignKey.association: '_TransactionCurrency'                               ⎪
    vbak.waerk                                   as TransactionCurrency,                      ⎪
    _TransactionCurrency,                                                                     ⎭
    ...
}
where vbak.vbtyp = 'C';
```

FIG. 7

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'     804
@Analytics.dataCategory: #DIMENSION
@AccessControl.authorizationCheck: #CHECK
@Metadata.allowExtensions: true
@Search.searchable: true
define view I_SampleSalesOrder
  as select from          vbak
    left outer to one join vbkd on  vbak.vbeln = vbkd.vbeln
                              and vbkd.posnr = '000000'
  association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer            as _SoldToParty
    on $projection.SoldToParty = _SoldToParty.Customer
{
  @Search.defaultSearchElement: true
  key cast(vbak.vbeln as vdm_sales_order preserving type) as SalesOrder,
  @ObjectModel.association.type: [#TO_COMPOSITION_CHILD]     //Composition
      _Item,
  vbak.vkorg                                  as SalesOrganization,
  vbak.auart                                  as SalesOrderType,
  vbak.vtweg                                  as DistributionChannel,
  @ObjectModel.foreignKey.association: '_SoldToParty'
  vbak.kunnr                                  as SoldToParty,
      _SoldToParty,
  @DefaultAggregation: #SUM
  @Semantics.amount.currencyCode: 'TransactionCurrency'
  vbak.netwr                                  as TotalNetAmount,
  @Semantics.currencyCode: true
  @ObjectModel.foreignKey.association: '_TransactionCurrency'
  vbak.waerk                                  as TransactionCurrency,
      _TransactionCurrency,
  ...
}
where vbak.vbtyp = 'C';
```

```
@EndUserText.label: 'Auto assigned role for I_SampleSalesOrder'
@MappingRole: true
define role I_SampleSalesOrder
{
  grant select on I_SampleSalesOrder
    where ( SalesOrderType ) =
      aspect pfcg_auth ( v_vbak_aat,
                         auart,
                         actvt = '03' );
}
```

808

812

```
@Metadata.layer: #CORE
annotate view I_SampleSalesOrder
  with
{
  @UI.lineItem: [{importance: #HIGH }]
  SalesOrder;
  @UI.lineItem: [{importance: #HIGH }]
  SalesOrderType;
}
```

816

```
@AbapCatalog.sqlViewAppendName: 'XINSAMPLEISO'
@EndUserText.label: 'Sales Order Extension India'
extend view I_SampleSalesOrder with X_IN_I_SampleSalesorder
{
  _SoldToParty.CustomerClassification
}
```

Select Statements — 1204

| Object Type | Object Name | Object VersionID | EntityName | PrimaryData SourceName | PrimaryData SourceType | WhereCondition CollectionID | JoinCondition CollectionID | ... |
|---|---|---|---|---|---|---|---|---|
| DDLS | DDLS1 | 56 | VIEW1 | TABLE1 | TABLE | | | ... |
| DDLS | DDLS2 | 77 | VIEW2 | TABLE2 | TABLE | | | ... |
| DDLS | DDLS3 | 88 | VIEW3 | TABLE3 | TABLE | 1 | | ... |
| DDLS | DDLS4 | 255 | VIEW4 | VIEW1 | VIEW | | 1 | ... |

Association Definition — 1284

| Object Type | Object Name | Object VersionID | Entity Name | Association Name | Association OriginalName | Target Entity Type | Target Entity Name | Target Minimum Cardinality | Target Maximum Cardinality | OnCondition CollectionID | ... |
|---|---|---|---|---|---|---|---|---|---|---|---|
| DDLS | DDLS2 | 77 | VIEW2 | _V2 | _V2 | VIEW | VIEW3 | 0 | 1 | 1 | ... |

Conditions — 1232

| Object Type | Object Name | Object VersionID | Condition Collection ID | Group ID | Grouping Ordinal Number | Grouping Operator | Left Group ID | Left Data Source Name | Left Field Name | Left Value | LeftToRight Relation | Right Group ID | Right Data Source Name | Right Field Name | Right Value | ... |
|---|---|---|---|---|---|---|---|---|---|---|---|---|---|---|---|---|
| DDLS | DDLS4 | 255 | 1 | 1 | 1 | | | VIEW1 | | | LEFT_OUTER_JOIN | 2 | | | | ... |
| DDLS | DDLS4 | 255 | 1 | 2 | 1 | | | VIEW2 | FIELD2 | | EQUAL | | VIEW1 | FIELD2 | | ... |
| DDLS | DDLS4 | 255 | 1 | 2 | 2 | AND | | VIEW2 | FIELD3 | | NOT_EQUAL | | | | REL | ... |
| DDLS | DDLS3 | 88 | 1 | | | | | TABLE3 | FIELD4 | | EQUAL | | | | X | ... |
| DDLS | DDLS2 | 77 | 1 | | 1 | | | VIEW2 | FIELD3 | | EQUAL | | VIEW3 | VIEW3 | | ... |

DDLS2

```
define view View2                                    1304
  as select from View1
{                                    1320
  key View1.Field1 as AliasedField1,
  case View1.Field2
    when 'VAL1' then 'X'
    when 'VAL2' then 'Y'
    else 'Z'                 1322
  end as CalculatedField2,                      1324
  concat( View1.Field1, View1.Field2) as CalculatedField3,
  cast( View1.Field3 as DE4 preserving type ) as CalculatedField4
}
                                                          1326
```

DDLS1

```
                              1308
  define view View1
    as select from Table1
  {                    1330
    key Table1.Field1,
        Table1.Field2,
        Table1.Field3  1332
  }    1334
```

TABLE1

```
                        1312
  define table Table1
  {          1340
    key Field1 : DE1 not null;
       Field2 : DE2;
  1342 Field3 : DE3;
  }         1344
```

FIG. 13

| Object Type 1402 | Object Name 1404 | Object Version ID 1406 | Entity Name 1408 | Field Name 1410 | Field Original Name 1412 | Base Entity Name 1414 | Base Entity Type 1416 | Base Field Name 1418 | Base Expression ID 1420 | IsKey Field 1422 | Data Element 1424 | Data Type 1426 | Data Type Length 1428 |
|---|---|---|---|---|---|---|---|---|---|---|---|---|---|
| DDLS | DDLS1 | 13 | VIEW1 | FIELD1 | Field1 | TABLE1 | TABL | FIELD1 | | TRUE | DE1 | CHAR | 30 |
| DDLS | DDLS1 | 13 | VIEW1 | FIELD2 | Field2 | TABLE1 | TABL | FIELD2 | | | DE2 | CHAR | 10 |
| DDLS | DDLS1 | 13 | VIEW1 | FIELD3 | Field3 | TABLE1 | TABL | FIELD3 | | | DE3 | CHAR | 20 |
| DDLS | DDLS2 | 65 | VIEW2 | ALIASEDFIELD1 | AliasedField1 | VIEW1 | VIEW | FIELD1 | | TRUE | DE1 | CHAR | 30 |
| DDLS | DDLS2 | 65 | VIEW2 | CALCULATEDFIELD2 | CalculatedField2 | | | | 1 | | | CHAR | 4 |
| DDLS | DDLS2 | 65 | VIEW2 | CALCULATEDFIELD3 | CalculatedField3 | | | | 2 | | | CHAR | 40 |
| DDLS | DDLS2 | 65 | VIEW2 | CALCULATEDFIELD4 | CalculatedField4 | VIEW1 | VIEW | FIELD3 | | | DE4 | CHAR | 20 |
| TABL | TABLE1 | 24 | TABLE1 | FIELD1 | | | | | | TRUE | DE1 | CHAR | 30 |
| TABL | TABLE1 | 24 | TABLE1 | FIELD2 | | | | | | | DE2 | CHAR | 10 |
| TABL | TABLE1 | 24 | TABLE1 | FIELD3 | | | | | | | DE3 | CHAR | 20 |

| Data Type Decimals 1430 | Field Definition StartLine 1432 | Field Definition StartColumn 1434 | Field Definition EndLine 1436 | Field Definition EndColumn 1438 | 1440 |
|---|---|---|---|---|---|
| ... | ... | ... | ... | ... | ... |
| | 4 | 2 | 4 | 35 | ... |
| | 5 | 2 | 9 | 25 | ... |
| | 10 | 2 | 10 | 57 | ... |
| | 11 | 2 | 11 | 65 | ... |
| ... | ... | ... | ... | ... | ... |

FIG. 14

| Object Type | Object Name | Object Version ID | Entity Name | SubEntity Name | Annotation InternalID | Annotation Name | Parent Annotation InternalID | AnnotationValue | Effective AnnotationValue |
|---|---|---|---|---|---|---|---|---|---|
| DDLS | DDLS2 | 312 | VIEW2 | KEYFIELD | 1 | ENDUSERTEXT | | | |
| DDLS | DDLS2 | 312 | VIEW2 | KEYFIELD | 2 | ENDUSERTEXT.LABEL | 1 | View2: Label text in English | LOCALIZED_TEXT:456 |
| DDLS | DDLS1 | 217 | VIEW1 | KEYFIELD | 1 | ENDUSERTEXT | | | |
| DDLS | DDLS1 | 217 | VIEW1 | KEYFIELD | 2 | ENDUSERTEXT.LABEL | 1 | View1: Label text in English | LOCALIZED_TEXT:135 |
| DDLS | DDLS1 | 217 | VIEW1 | KEYFIELD | 3 | ENDUSERTEXT.QUICKINFO | 1 | View1: Quickinfo text in English | LOCALIZED_TEXT:249 |
| DDLX | DDLX2 | 672 | VIEW2 | KEYFIELD | 1 | SEARCH | | | |
| DDLX | DDLX2 | 672 | VIEW2 | KEYFIELD | 2 | SEARCH.DEFAULTSEARCHELEMENT | 1 | | TRUE |

| TextID | Language Code | Text |
|---|---|---|
| 135 | EN | View1: Label text in English |
| 135 | DE | View1: Bezeichnertext in Deutsch |
| 456 | EN | View2: Label text in English |
| 456 | DE | View2: Bezeichnertext in Deutsch |
| 249 | EN | View1: Quickinfo text in English |
| 249 | DE | View1: Schnellinfotext in Deutsch |

FIG. 16

| Object Type (1704) | Object Name (1708) | Object Version ID (1710) | Active Annotation VersionID (1730) | Entity Name (1712) | SubEntity Name (1714) | Annotation InternalID (1716) | Annotation Name (1718) | Parent Annotation InternalID (1720) | Annotation Value (1722) |
|---|---|---|---|---|---|---|---|---|---|
| DDLS | DDLS2 | 312 | 588 | VIEW2 | KEYFIELD | 1 | ENDUSERTEXT | | |
| DDLS | DDLS2 | 312 | 588 | VIEW2 | KEYFIELD | 2 | ENDUSERTEXT.LABEL | 1 | View2: Label text in English |
| DDLS | DDLS2 | 312 | 588 | VIEW2 | KEYFIELD | 3 | ENDUSERTEXT.QUICKINFO | 1 | View1: Quickinfo text in English |
| DDLS | DDLS2 | 312 | 588 | VIEW2 | KEYFIELD | 4 | SEARCH | | |
| DDLS | DDLS2 | 312 | 588 | VIEW2 | KEYFIELD | 5 | SEARCH.DEFAULTSEARCHELEMENT | 4 | |

1700

| Effective AnnotationValue (1724) | AnnotationOrig ObjectType (1732) | AnnotationOrigin ObjectName (1734) | AnnotationOrigin ObjectVersionID (1736) |
|---|---|---|---|
| ... | ... | ... | ... |
| LOCALIZED_TEXT:456 | DDLS | DDLS2 | 312 |
| LOCALIZED_TEXT:249 | DDLS | DDLS2 | 312 |
| | DDLS | DDLS1 | 217 |
| | DDLX | DDLX2 | 672 |
| | DDLX | DDLX2 | 672 |

FIG. 17

1912 ObjectVersionSource 1914 1916

1904

| ObjectType | ObjectName | ObjectVersionId | ... |
|---|---|---|---|
| DDLS | I_CUSTOMER | 1 | ... |
| DDLS | I_CUSTOMER | 2 | ... |
| DDLS | I_CUSTOMER | 3 | ... |
| DDLS | I_CUSTOMER | 4 | ... |
| DDLS | I_CUSTOMER | 5 | ... |
| DDLS | I_SALESORDER | 1 | ... |
| DDLS | I_SALESORDER | 2 | ... |
| DDLS | I_SALESORDER | 3 | ... |
| DDLS | I_SALESORDERITEM | 1 | ... |

1908

DdlsVersion 1920 1922 1924 1926

| DdlsName | DdlsVersionID | CdsEntityName | CdsEntity OriginalName | ... |
|---|---|---|---|---|
| I_CUSTOMER | 1 | I_CUSTOMER | I_Customer | ... |
| I_CUSTOMER | 2 | I_CUSTOMER | I_Customer | ... |
| I_CUSTOMER | 3 | I_CUSTOMER | I_Customer | ... |
| I_CUSTOMER | 4 | I_CUSTOMER | I_Customer | ... |
| I_CUSTOMER | 5 | I_CUSTOMER | I_Customer | ... |
| I_SALESORDER | 1 | I_SALESORDER | I_SalesOrder | ... |
| I_SALESORDER | 2 | I_SALESORDER | I_SalesOrder | ... |
| I_SALESORDER | 3 | I_SALESORDER | I_SalesOrder | ... |
| I_SALESORDERITEM | 1 | I_SALESORDERITEM | I_SalesOrderItem | ... |

FIG. 19

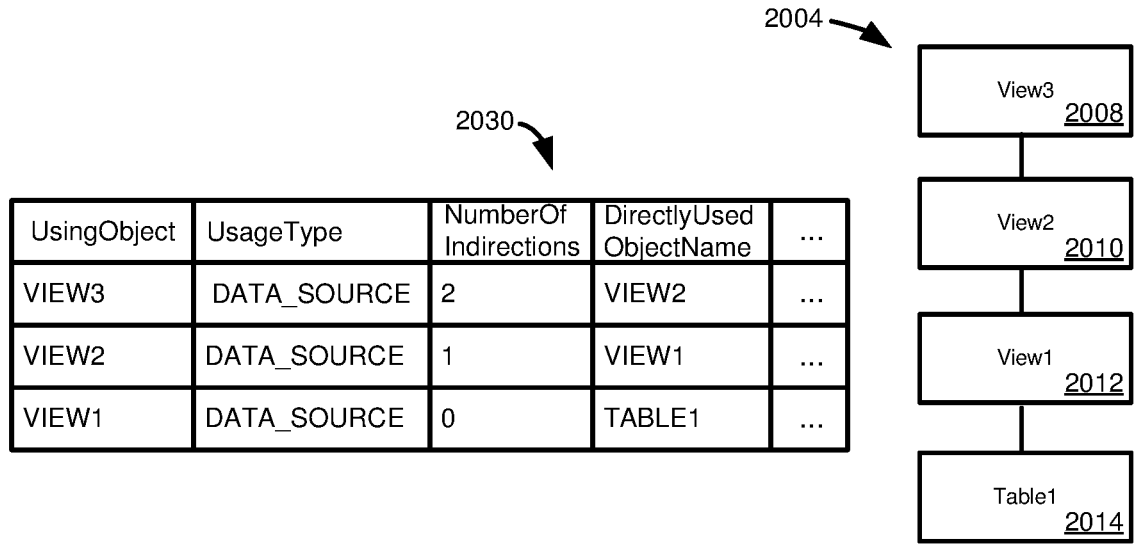

FIG. 20

```
<Annotations xmlns="http://docs.oasis-open.org/odata/ns/edm" Target=".../FieldName">
  <Annotation Term="Common.ValueList">
    <Record>
      <PropertyValue String="FieldName" Property="Label"/>
      <PropertyValue String="Field" Property="CollectionPath"/>
      <PropertyValue Property="SearchSupported" Bool="true"/>
      <PropertyValue Property="Parameters">
        <Collection>
          <Record Type="Common.ValueListParameterInOut">
            <PropertyValue Property="LocalDataProperty" PropertyPath="FieldName"/>
            <PropertyValue String="FieldName" Property="ValueListProperty"/>
          </Record>
          <Record Type="Common.ValueListParameterDisplayOnly">
            ...
          </Record>
          ...
        </Collection>
      </PropertyValue>
    </Record>
  </Annotation>
</Annotations>
```

FIG. 21

METADATA ELEMENTS WITH PERSISTENT IDENTIFIERS

FIELD

The present disclosure generally relates to metadata for data artefacts. Particular implementations provide for maintaining a particular name for a metadata element even if the metadata element is subsequently renamed.

BACKGROUND

Ever increasing amounts of data are becoming available, from an increasing variety of sources. Data associated with a specific purpose, such as a specific analog-world entity, is typically associated with metadata that describes that data. For example, a ten-digit integer might be data, but without metadata, it may be difficult to know what that ten-digit integer represents—a phone number, a driver's license number, a password, etc. Thus, using and making "sense" of data can be highly dependent on having the correct metadata to provide context to the data.

Systems that store or use metadata can use metadata in different formats, or can have different rules regarding how metadata can be expressed. For example, even if metadata is in a same general format, one implementation of the format may allow for a greater number of characters in the name of a metadata element than another implementation of the format. Similar issues can arise when different general formats are used. The use of different names for the same metadata element can complicate use of the metadata. Thus, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for retaining names for metadata elements, such as when metadata is imported, converted to a different format, or used with a system that may have restrictions on naming different than a system on which the metadata is created. Metadata includes a plurality of metadata elements, including a first metadata element associated with a first name. A second name is received for the first metadata element. The second name is assigned to the first metadata element. An association is created between the renamed first metadata element and the first name.

In one embodiment, the present disclosure provides a method for renaming a metadata element yet maintaining an association with an original name for the metadata element. A request is received to import metadata that includes a plurality of metadata elements, at least a portion of which metadata elements are associated with a respective first name. A second name is received for at least one of the metadata elements. The second name is assigned to the at least one metadata element. An association between the at least one metadata element and its respective first name is created.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

BRIEF DESCRIPTION OF THE DRAWINGS

FIG. 7 is code for an example metadata model for a database view.

FIG. 8 is code for an example metadata model for a database view, and for metadata models which modify or refer to such example metadata model.

FIG. 12 provides example database tables illustrating how metadata model information presented in FIG. 11 can be stored in a relational format.

FIG. 13 is a schematic diagram illustrating how metadata models can have fields that are defined with respect to other metadata models.

FIG. 14 provides an example database table illustrating how metadata model information presented in FIG. 13 can be stored in a relational format.

FIGS. 16 and 17 provide example database tables illustrating how metadata model information presented in FIG. 15 can be stored in a relational format.

FIGS. 19 and 20 present example tables that can be used to carry out operations requested through a data access service.

FIG. 21 presents example code that can be used to annotate a user interface service displaying metadata model information.

DETAILED DESCRIPTION

Example 1)—Overview

Figure 1:
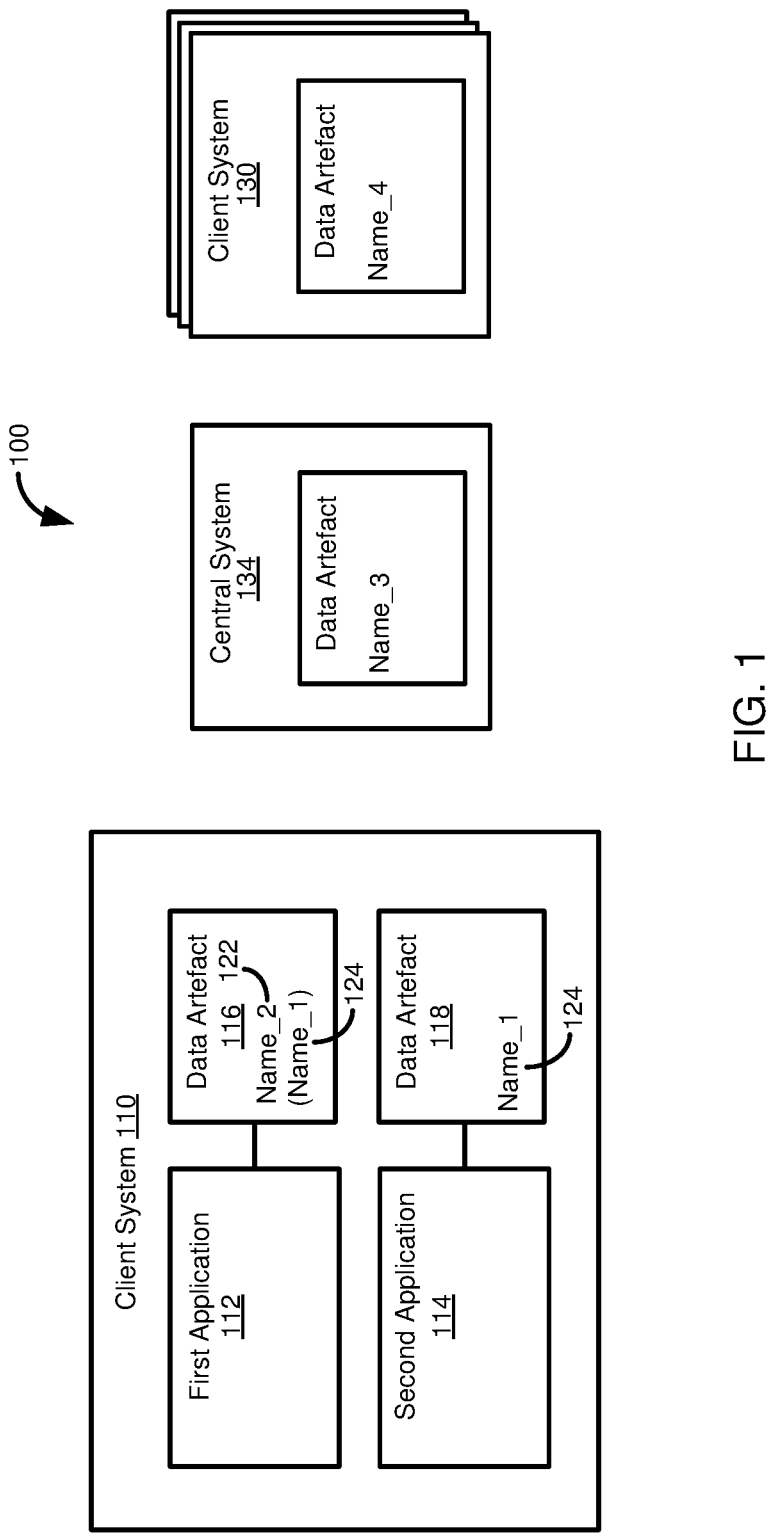
FIG. 1 is a diagram illustrating an example computing environment having a metadata element with name retention information.

Ever increasing amounts of data are becoming available, from an increasing variety of sources. Data associated with a specific purpose, such as a specific analog-world entity, is typically associated with metadata that describes that data. For example, a ten-digit integer might be data, but without metadata, it may be difficult to know what that ten-digit integer represents—a phone number, a driver's license number, a password, etc. Thus, using and making "sense" of data can be highly dependent on having the correct metadata to provide context to the data.

Systems that store or use metadata can use metadata in different formats, or can have different rules regarding how metadata can be expressed. For example, even if metadata is in a same general format, one implementation of the format may allow for a greater number of characters in the name of a metadata element than another implementation of the format. Similar issues can arise when different general formats are used. The use of different names for the same metadata element can complicate use of the metadata. Thus, room for improvement exists.

It is often desirable to share metadata between systems, where the systems can be associated with the same client/entity or with different clients/entities. As an example, a particular client may use metadata, such as for a database artefact (or another artefact which corresponds to one or more database artefacts) in an end user application or as part of a middleware solution, where the database and the end user application middleware solution may express metadata in different formats or in a common format, but subject to differing constraints. In some cases, the metadata is stored in different formats in the different client systems. In other cases, even if metadata is stored in the same format (e.g., JSON), the requirements or limitations on how metadata is expressed can differ between the systems.

Take, for example, a metadata element representing a name for a data artefact, such as a database artefact (e.g., a table or view). When modelling the database, or data objects that will interact with the database, it can be useful to label data objects and elements thereof with long, descriptive names. However, such names may not be supported by a database having tables that store data for the data object. The database may only support names that are much shorter than those used when modelling, or may support different naming conventions (e.g., some characters that are useable when modelling may not be permitted in the name of a database table or elements of a database table). While the longer name can be changed, such as being truncated, for use in the database system, the correspondence of a database artefact with the data object/artefact at the modelling level maybe lost. Similarly, some applications may support names that are structured (e.g., JSON, XML), while other applications may not. In at least some cases, an original name can be maintained in a structured form as an annotation, even if the structured version of the name cannot be used as the name in a system (in some cases, the name can be a flattened version of the structured name, but the structured name is kept as structure data in an annotation).

Issues with overlapping names can also arise when combining data. For instance, a client A may import metadata for an "employee" object or data artefact from client B. However, client A may need to rename "employee" to avoid having it overwrite data already maintained by client A for its "employee" object or data artefact. While a conflict can be avoided by renaming the "employee" object/artefact, information may be lost that associates the object/artefact with the object/artefact of client B. Even in the absence of a conflict, it may be useful to apply different names to different versions of a metadata element, such as providing namespace information to distinguish information obtained from different systems or environments (including, for example, to separate local content from imported content).

The present disclosure provides for adding a metadata element to a data object or artefact (for the rest of this disclosure, the term "artefact" will be used to refer to an artefact or a data object) that refers to a name of another data artefact. More particularly, the metadata element stores an original name for the metadata element, where the original name is the name provided by a system, or a specific software application on a specific system, that originally created or instantiated the element (or an artefact that includes the element).

In some cases, a given element or data artefact includes a single "original name" element. For example, assume a data artefact is created on system A with a name A, and that data artefact is then imported into system B and given the name B. The data artefact B would be annotated with an indication that the original name was "name A." If the data artefact B was then imported from system B into system C and given the name C, the data artefact would retain the annotation of the original name, "name A," but would not include an annotation indicating that the data artefact had "name B" on system B. It can still be determined that data artefact B and data artefact C are related, given that they both include the original name, "name A."

In other implementations, names other than, or in addition to, an original name can be stored for a data artefact or an element thereof. Continuing the example above, data artefact C on system C could be annotated with "name B" in addition to, or instead of, annotating the artefact with "name A." Further, in some implementations a data artefact or element thereof can be annotated with information in addition to a name used by a prior system or application, such as an identifier of the system or systems from which a data artefact was imported, a namespace associated with a source system, or information about an environment of the source system (e.g., an application with which the artefact was used in the source system).

Information about the naming of a data artefact, or element thereof, in a source system (generally referred to as an "original name mapping") can be used for a variety of purposes. For example, if it is desired to determine whether a data artefact is on a particular system, such as for update purposes, the relevant data artefacts can be located based on the original name mapping—data artefacts will not be missed because the name of the data artefact, or an element thereof, is not the same as when the data artefact (or element) was created.

A data artefact (or element) can be retrieved using its original name mapping in some implementations. A request using the original name can return one or both of the referenced data artefact/element or a name other than the original name (which can also be referred to as a local name) in response to a request using the original name. Allowing data artefacts to be retrieved or referenced using their original names can hide complexity from users/processes, as the users/processes do not need to be aware that the data artefact or element is associated with a name other than the original name. In other cases, artefacts or elements can be referenced by their local names, but information about any original name mappings can also be provided.

In some cases, an original name of a source system can be more complicated (e.g., using a larger number or variety of characters, being structured versus unstructured) than a name used in the target system. However, in other cases a target system can use more complex names than the name used in the original name mapping.

The tracking of an "original name" (which can be more generally thought of as a "source name") can be used in various scenarios, including where metadata is handled in a decentralized way or where metadata is handled in a centralized way. In a decentralized scenario, any metadata source can be the source of an "original name," even if a centralized metadata source exists or if some metadata sources might normally have a higher priority than others. The "original name mapping" is useful to relate particular metadata back to its original source, no matter the nature of the source.

In a centralized scenario, the use of an "original name mapping" is useful so that all systems that use particular metadata can relate that metadata back to the central source. As with the decentralized case, some systems that receive metadata from a source (in this case the centralized system) may not support a name used by the source, or it may otherwise be desired not to use the name from the source system (for example, to maintain separate namespaces or because the name used in the source system conflicts with a name already in use by the target system). In this case, the "original name mapping" can be thought of as a "centralized source name mapping"—target systems use the mapping to refer back to the name used by the central system.

Example 2)—Example Computing Environment Supporting Name Retention

FIG. 1 illustrates an example computing environment 100 that facilitates metadata storage and retrieval. The computing environment 100 can include one or more computing systems or devices. For example, the computing environment 100 can include a client system 110 that includes a first software application 112 and a second software application 114. The first software application 112 and the second software application 114 can use at least one of the same data artefacts, and at least some metadata for the data artefacts. However, the first and second software applications 112, 114 can use the data artefacts/metadata in different formats, or rules for expressing how data artefacts/metadata can differ.

As an example, the software application 112 can be a software application that uses a virtual data model, an artefact of which can be represented by data artefact 116, that is related to a physical data model used by a database application that serves as the second software application 114, where a definition of the database artefact can be represented as data artefact 118.

Some of the metadata used by the application 112 in the data artefact 116 may not be useable in the data artefact 118 of the second application 114. In addition, even for metadata of the data artefact 116 that does have a counterpart in the metadata artefact 118 used by the second software application 114 (e.g., a name of a database table or database view), the metadata may be expressed differently. For example, the first software application 112 can allow a database table or view to be named using 128 characters in the data artefact 116, while the second software application may only allow 16 characters to be used for the corresponding metadata element in the data artefact 118.

To confirm that the data artefact 116 and the data artefact 118 are referring to the same metadata, when this situation applies, the metadata artefact 118 can be enhanced with additional metadata providing a name used for the metadata element in the data artefact 116. Or, the data artefact 116 can be enhanced with additional metadata providing a name used for the metadata element in the data artefact 118. In at least some cases, this "original name mapping" information is included in a definition or description of a data artefact, or is otherwise included with the metadata to which the mapping information applies.

In the example shown, the data artefact 118 serves as the "original" version of the metadata/data artefact, and so the data artefact 116 includes the name 122 (which can be the name of a data artefact, an example of a metadata element) as used by the first software application 112 and the name 124 as used by the second software application 114, where the name 124 (in association with the name 122) serves as an "original name mapping."

In some cases, the "original name" refers to a name or identifier provided when a metadata element was created. Thus, in the above scenario it would be assumed that the table or view was created, and given the name 124, when the table or view was created by the database application (the second software application 114). If, instead, the table or view had first been created by the first software application 112, then the name provided by the first software application would, at least in this implementation, be included with the metadata for the data artefact 118 of the second software application 114 as the original name mapping.

In other cases, "original name" can be defined as something other than the name first applied to a metadata element. In various implementations, "original name" can mean "base name," "common name," "preferred name," or "default name." For example, a data artefact 116, such as a database table or view, could be defined as part of a virtual data model using the first software application 112. Thus, the name applied by the first software application 112 to the data artefact 116 would be the "original name" if original name was defined as "first in time." For a variety of reasons, it may be desirable to instead use the name of the table as used by the database system, the second application 114. If issues arise in using the name 122 of the metadata element as used in the data artefact 116 by the first software application 112 as the name of the data artefact 118 used by the second software application 114, then it may be useful to instead use the data artefact 118 as the "source" name." For example, the format of the data artefact 118 or the configuration of the second application 114 may not allow storing the name 122 provided by the first application 112 for the data artefact 116 (e.g., a database may not support the length of a name provided by another software application), or the format in which metadata is stored may not allow for easy storing of another name.

An expression of metadata in a format such as JSON or XML, for example may be easier to add additional information to, as compared with a definition of a database table, which may be difficult to modify. That is, a format for describing a database table may not have a metadata element for providing an "original name," and it may be undesirable to modify the table, such as adding a field/column, to store an original name. However, if desired, the metadata for a data artefact can be modified to store an original name, or a data artefact can otherwise be modified to store an original name. While in some cases it can be desirable to store the original name with a name used by another software application, such as in a definition or description of a data artefact, in other cases it can be desirable to store the original name mapping elsewhere. In the example of a database table where it can be difficult or undesirable to store an original name in a definition of a database table, a separate table can be provided that maps original names to names used in another context, or the mapping information can be stored outside of the database.

In some cases, an association, the original name mapping, between a name of the metadata element to be maintained with a renamed metadata element is automatically created when it is determined that the metadata element has been, or is to be, renamed. In other cases, the association is manually created.

Similarly, in some cases, a new name is automatically applied to the metadata element, such as if it is determined that an original name is not preferred for use, or not supported by, a new environment in which the metadata element is used, or in other cases the new name can be manually assigned. That is, a rule can determine that an original name is not useable (e.g., the name is too long) and another rule or algorithm can describe how the name should be modified (e.g., by truncating the name). In further implementations, a notification can be generated that a metadata element name is not supported by, or otherwise not to be used by, a new environment, and a message can be sent to a user or a computer process that the metadata element should be renamed. The renaming can then be accomplished by the user or process.

Because the association/original name mapping is used to relate different versions or expressions of metadata, it can be useful in some cases to prevent or restrict (such as to authorized users or processes) modification of the "original" name, or to prevent or restrict removal of the association/original name mapping.

The computing environment 100 can have additional computing systems in addition to the computing system 110. For example, the computing environment 100 can have one or more additional client systems 130 or a central computing system 134. The additional client systems 130 or the central computing system 134 can work with the client system 110 in a similar manner as described for the first application 112 and the second application 114.

Example 3)—Example Metadata Elements with Name Retention Information

Figure 2:
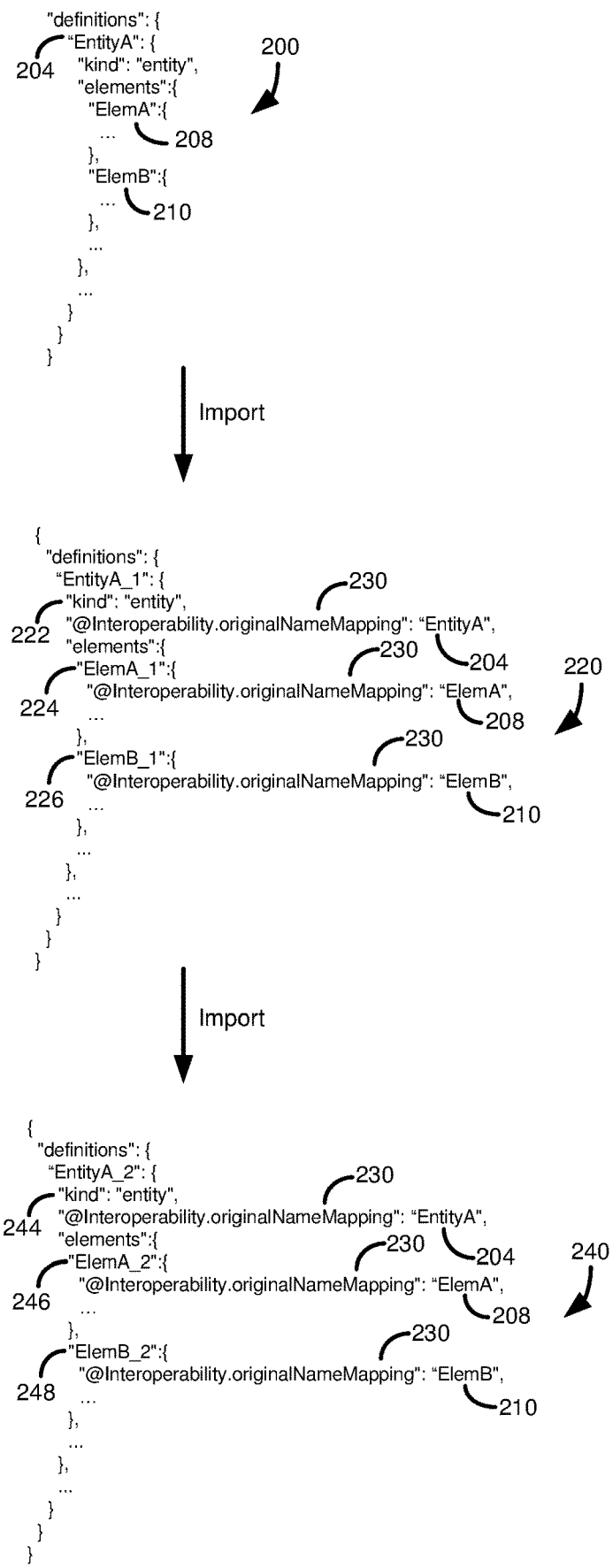
FIG. 2 provides example metadata listings, including listings that include name retention information.

FIG. 2 provide an example of partial CSN (core schema notation, as used in software available from SAP SE, of Walldorf, Germany) listings 200, 220, 240 illustrating how a database artefact, or metadata for a database artefact, can include a reference to a name of a metadata element from another context, such as another application or another computing system.

Listing 200 represents a source listing for a database artefact, entity A. The listing 200 includes a definition 204 of an entity (having the name/identifier "EntityA"), which in turn has two metadata elements 208, 210 (having the names/identifiers of "ElemA" and "ElemB"). Assume that all or a portion of the listing 200 is to be incorporated into another listing, such as listing 220. Listing 220 includes the same components as listing 200, the names of an entity and its two metadata elements, but the values 222, 224, 226 of the names are different than the values used in the listing 200. As has been discussed, differences in names used in different metadata collections describing the same data (e.g., a data artefact) can result from metadata being expressed in different formats or being subject to different constraints, or because names used by one system (for example, a source system) conflict with names used by another system (for example, a target system). So, in addition to the name values 222, 224, 226 used for the listing 220, the listing 220 includes the name values 204, 208, 210 of the listing 200. A specific identifier 230 be used with the name values 204, 208, 210 indicating that they are not the local names used in listing 220 and designating the name values as the original name mapping information for the relevant metadata element.

Assume further that all or a portion of the listing 220 is incorporated into the listing 240. The listing 240 includes the same components as the listing 200 and the listing 220, but the values 244, 246, 248 for the names of the entity and its two metadata elements are different than the values used in the listing 200 or in the listing 220. As with the listing 220, the listing 240 includes the name values 204, 208, 210 along with the identifier 230 identifying such values as not being the local names. In this scenario, even though the listing 240 may be associated with the listing 220 (for example, the listing 220 was imported into a computer system as the listing 240), the listing 240 does not include information about local names used in the listing 220 for the name values 204, 208, 210.

Note, however, that a listing can incorporate metadata elements from multiple sources. For example, consider a scenario where listing 220 includes a new metadata element (ElemC_1) that is first defined in the listing 220 (not directly corresponding to a metadata element of the listing 200). The listing 240 could include an identifier for Elem C that is specific to the listing 240, say ElemC_2, but the listing 240 can include an identifier associating the metadata element with the name used in the listing 220. The name values 204, 208, 210 would be used for the metadata elements originating from the listing 200. Similarly, the listing 240 can include metadata elements that do not have a corresponding element in the listings 200, 220, in which case the identifier 230 need not be included for such metadata elements.

Note that the listings 200, 220, 240 focus on the name of the metadata elements, rather than other properties of the metadata elements. Other properties of the metadata elements may be the same or different between local environments (e.g., listings). For example, if metadata element 208 represents a data member (or variable, or database field), the metadata element in the listing 220 can have the same data type or other properties as the metadata element listing 200 (for example, both metadata elements could have integer values, or one metadata element could have an integer value and the other metadata element could have a string value), or can have different properties. The identifier 230 primarily serves to link the name 224 with the name 208. Knowing that metadata elements 224 and 208 are related can help identify whether/how the listings 200, 220 differ. Without the original name mapping provided by the identifier 230, it may not be known that the listing 200, 220 contain potentially different expressions of a common metadata element, or that the listing 220 includes a counterpart to the metadata element 208 even if the expressions are the same, other than the difference between the local name and the original name.

In some cases, software is designed so that, at least within a program or a group of related programs, metadata elements having a common name refer to the same metadata elements. Thus, there may not be a need to include an original name mapping when multiple data artefacts, or versions of the same data artefact, use the same metadata element name. In other case, no assumptions are made for metadata elements that are not tagged with an original name mapping.

In yet further implementations, it is assumed that metadata from a source application or system is unchanged when imported by another system or application. That is, it is assumed, and optionally enforced, that data artefacts having a metadata element with an original name mapping have at least the properties of the original metadata element. In at least some cases, additional properties, such as annotations, can be added to a metadata element having an original name mapping, such as by extending the metadata element. Extensions to data artefacts/metadata are further discussed in Examples 8-15.

Example 4—Example Retrieval of Metadata Element Names

Various information can be extracted from metadata collections, including an original name associated with a metadata element, a local name for a metadata element, or both an original name and a local name for a metadata element. For example, local names can be effectively hidden if desired.

Figure 3:
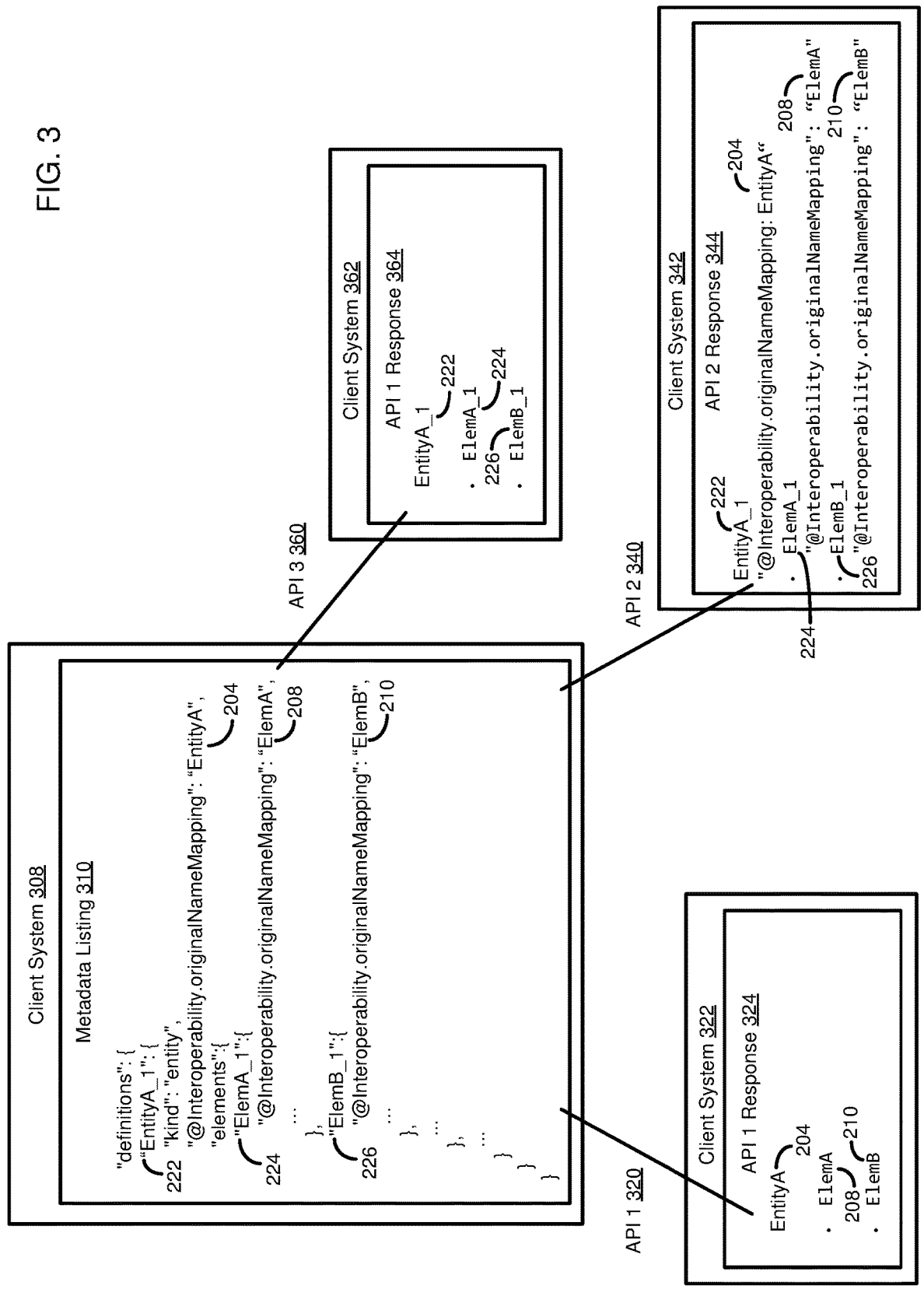
FIG. 3 is a diagram illustrating how different metadata element names can be retrieved depending on API implementation.

FIG. 3 illustrates two scenarios for retrieving metadata information from a metadata listing 310 associated with a client system 308. The metadata listing 310 corresponds to the metadata listing 220 of FIG. 2. A first API 320 is configured to retrieve only original names for metadata elements, and so provides a response 324 to a client system 322 that includes the original names 204, 208, 210. If the metadata listing 310 included additional metadata elements, those metadata elements could also be included in the results 324, as the names for such metadata elements would not conflict with a name provided by an original name mapping. The API 320 can be useful, for instance, when an application or user is dealing with the same metadata, but from multiple sources, which may have different local names for what are really common metadata elements.

A second API 340 is configured to retrieve both the original names 204, 208, 210 and the local names 222, 224, 226 for metadata elements having an original name mapping, as shown in the response 344 provided to a client system 342. As with the first API 320, if the metadata listing 310 includes metadata elements that are originally defined in the listing 310, or are otherwise not associated with an original name mapping, those metadata elements can also be included in the response 344.

A third API 360 is configured to retrieve only the local names 222, 224, 226 for the metadata listing 310, as shown in a response 364 provided to a client system 362. The response can include metadata elements that are not associated with an original mapping name. Although the original names 204, 208, 210 are not returned in the response 364, they can still be available for other purposes, such as for searching.

Example 5—Example Table Elements Including Semantic Identifiers

Database systems typically include an information repository that stores information regarding a database schema. For instance, PostgreSQL includes an INFORMATION_SCHEMA that includes information regarding tables in a database system, and certain table components, such as attributes (or fields) and their associated datatypes (e.g., varchar, int, float). Other database systems, or query languages, include similar concepts. However, as described above, these types of repositories typically only store technical information regarding database components, not semantic information.

Other database systems, or applications or frameworks that operate using a database layer, may include repositories that store semantic information for data. For instance, SAP SE of Walldorf, Germany, provides the ABAP programming language which can be used in conjunction with database systems. ABAP provides the ability to develop database applications that are agnostic to the nature, including vendor, of the underlying relational database management system. In part, this ability is enabled using a data dictionary. The data dictionary can include at least some information that is similar to information that is maintained in an information schema. However, the data dictionary can include semantic information regarding data, and optionally additional technical information.

In addition, the data dictionary can include textual information regarding fields in a table, such as human-readable descriptions (sometimes in different languages, such as English, French, or German) of the purpose or use of the field. In at least some cases, the textual information can serve as semantic information to a computer. However, other types of semantic information need not necessarily be (at least easily) human-understandable, but can be easier for a computer to process than parsing textual information primarily intended for human use. Data dictionaries can also contain or express relations between data dictionary objects through various properties (which can be reflected in metadata), such as having the data dictionary reflect that dictionary objects are assigned to packages, and thus having a relationship to one another through a package assignment. The information in a data dictionary can correspond to metadata that can be retrieved from a source system by a target system according to the techniques previously described in this disclosure.

As used herein, "technical information" (or technical metadata) relates to information that describes data as data, which is information such as a type that can be used to interpret a value of the data, and which can influence how the data is processed. For instance, the value "6453" could be interpreted (or cast) as an integer, a float, a string, or an array of characters, among various possibilities. A value may be processed differently, in some cases, depending on whether it is a number, such as an integer or a float, or whether it is treated as a collection of characters. Similarly, technical information can specify acceptable values for data, such as a length or a number of decimal places that are allowed. The technical information can specify properties of the data without concern regarding what the data represents or "means." Of course, however, a designer of a database system can select particular technical properties for particular data knowing themselves the semantic properties of the data—e.g., "If I intend to have a value representing a person's name, I should use a string or array of characters rather than a float." On the other hand, in at least some cases, data types might be a type that would not be expected by a database administrator or user. For instance, rather than using a person's name to identify data associated with the person, a separate numerical or alphanumerical identifier might be used, which might be counter intuitive based on the "meaning" of the data (e.g., "I do not consider myself to be a number").

As used herein, "semantic information" (or semantic metadata) relates to information that describes the meaning or purpose of data, which meaning or purpose can be to a human or to a computer process. As an example, technical data information may specify that data is obtained having a value in the format "XXX-XX-XXXX," where X is an integer between 0 and 9. That technical information can be used to determine how the data should be processed, or whether a particular value is valid (e.g., "111-11-1111" is, but "1111-11-1111" is not), but does not indicate what the value represents. Semantic information associated with the data can indicate whether the value is a social security number, a telephone number, a routing address, etc.

Semantic information can also describe how data is to be processed or displayed. For instance, "knowing" that data is a telephone number may cause the value to be displayed in one part of a GUI as opposed to another part of a GUI, or may invoke or not invoke particular processing rules depending on if the rule is active for "telephone number." In at least some cases, "semantic information" can include other types of information that can be used to describe data, or how it should be used or processed. In a particular case, data can be associated with one or more of a label, such as a human understandable description of the data (e.g., "telephone number"), documentation, such as a description of what information should be included in a field having the label (e.g., "enter an 11 digit phone number including area code"), or information that can be used in a help screen (e.g., "enter your home phone number here").

Typically, technical information must be provided for data. In the case of a field of a database table, for example, it is typically necessary to provide a name or identifier for a field and a datatype. The name or identifier for a field might, or might not, serve to provide semantic information. That is, a database designer might choose a name of "Employee_Name," "EMPN," or "3152." However, as the name or identifier is used to locate/differentiate the field from another field, in the context of the present disclosure, it is considered to be technical information, rather than semantic information, even if it may readily convey meaning to a human. In at least some implementations, the use of semantic information is optional. For instance, even using the data dictionary, some fields used in database objects (such as tables, but potentially other objects too, where such other objects are typically associated with one or more tables in an underlying relational database system) can be specified without the use of semantic information, while other fields are associated with semantic information.

Figure 4:
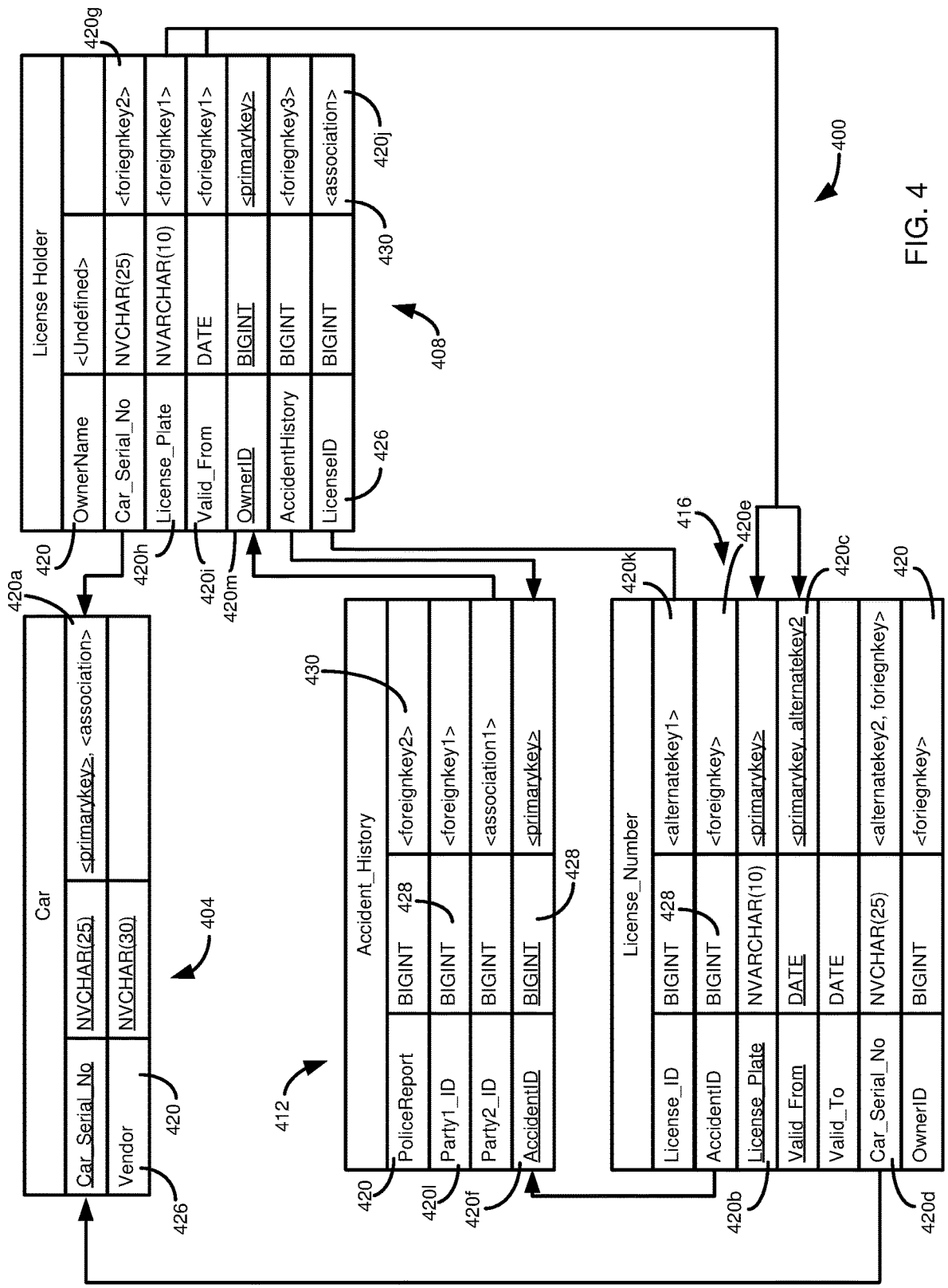
FIG. 4 is a diagram of a database schema showing technical relationships between at least a portion of database tables in the schema.

FIG. 4 is an example entity-relation (ER) type diagram illustrating a data schema 400, or metadata model, related to a driver's accident history. The schema 400 (which can be part of a larger schema, the other components not being shown in FIG. 4) can include a table 408 associated with a license holder (e.g., an individual having a driver's license), a table 412 associated with a license, a table 416 representing an accident history, and a table 404 representing cars (or other vehicles).

Each of the tables 404, 408, 412, 416 has a plurality of attributes 420 (although, a table may only have one attribute in some circumstances). For a particular table 404, 408, 412, 416, one or more of the attributes 420 can serve as a primary key—uniquely identifying particular records in the tuple and being designated as the main method of accessing tuples in the table. For example, in the table 404, the Car_Serial_No attribute 420a serves as the primary key. In the table 416, the combination of attributes 420b and 420c together serve as the primary key.

A table can reference records associated with the primary key of another table through the use of a foreign key. For example, the license number table 416 has an attribute 420d for a Car_Serial_No in table 416 that is a foreign key and is associated with the corresponding attribute 420a of table 404. The use of a foreign key can serve various purposes. The foreign key can link particular tuples in different tables. For example, a foreign key value of 8888 for the attribute 420d would be associated with a particular tuple in table 404 having that value for attribute 420a. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, that can serve to uniquely identify tuples, but which are not primary keys. Table 416, for instance, has an alternate key that is formed from attribute 420c and attribute 420d. Thus, a unique tuple can be accessed in the table 416 using either the primary key (e.g., being a foreign key in another table) or through an association to the alternate key.

Schema information is typically maintained in a database layer, such as a software layer associated with where table values are maintained (e.g., in a RDBMS), and typically includes identifiers for the tables 404, 408, 412, 416, and the name 426 and datatype 428 of their associated attributes 420. Schema information may also include at least some of the information conveyable using the flag 430, such as whether a field is associated with a primary key, or indicating a foreign key relationship. However, other relationships, including more informal associations, may not be included in a schema associated with a database layer (e.g., the INFORMATION_SCHEMA of PostgreSQL).

Example 6—Example Table Elements Including Semantic Identifiers

Figure 5:
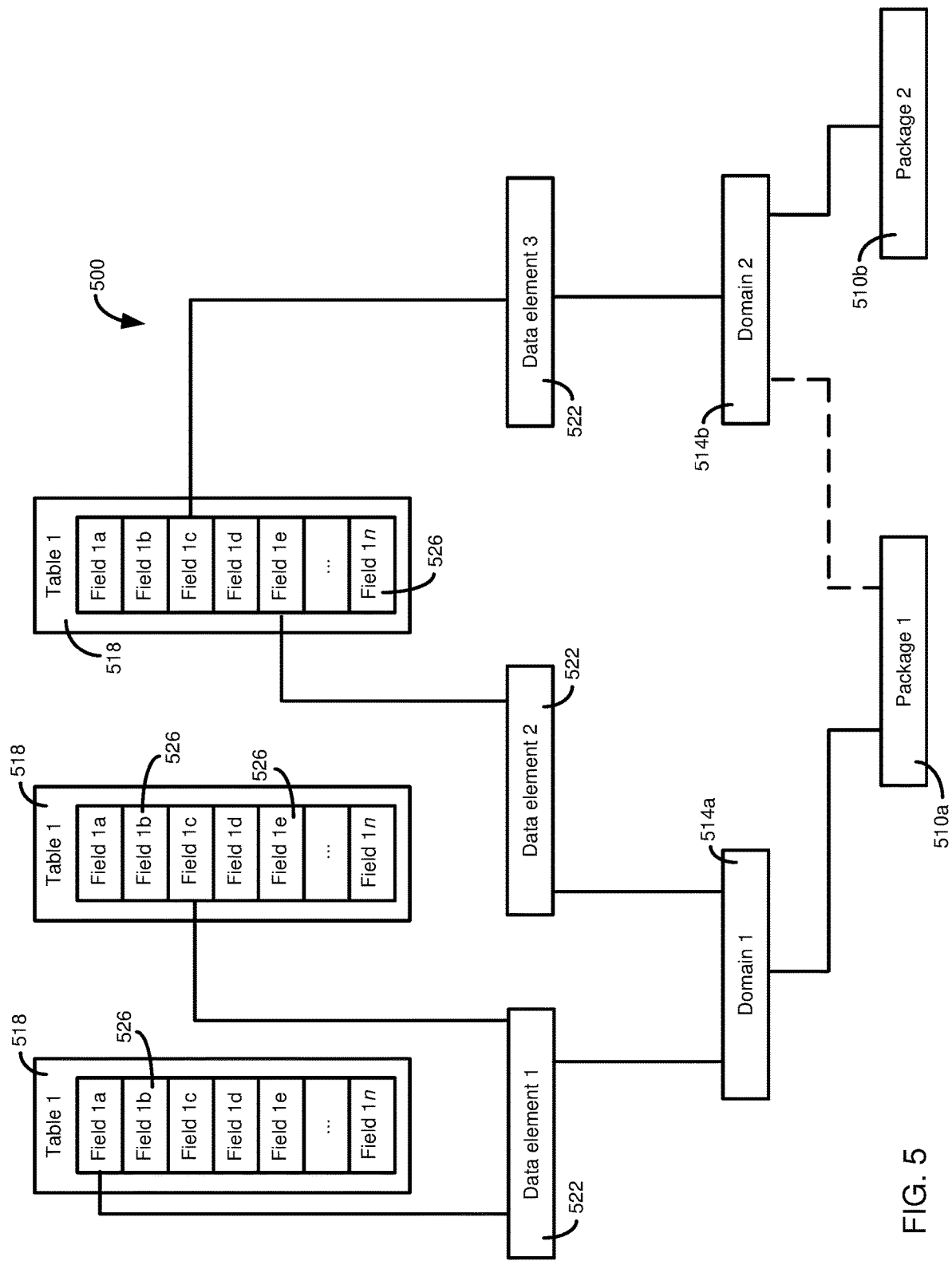
FIG. 5 is a schematic diagram illustrating relationships between table elements that can be included in a data dictionary, or otherwise used to define database tables.

FIG. 5 is a diagram illustrating elements of a database schema 500 and how they can be interrelated. In at least some cases, the database schema 500 can be maintained other than at the database layer of a database system. That is, for example, the database schema 500 can be independent of the underlying database, including a schema used for the underlying database. Typically, the database schema 500 is mapped to a schema of the database layer (e.g., schema 400 of FIG. 4), such that records, or portions thereof (e.g., particular values of particular fields) can be retrieved through the database schema 500.

The database schema 500 can include one or more packages 510. A package 510 can represent an organizational component used to categorize or classify other elements of the schema 500. For example, the package 510 can be replicated or deployed to various database systems. The package 510 can also be used to enforce security restrictions, such as by restricting access of particular users or particular applications to particular schema elements.

A package 510 can be associated with one or more domains 514 (i.e., a particular type of semantic identifier or semantic information). In turn, a domain 514 can be associated with one or more packages 510. For instance, domain 1, 514a, is associated only with package 510a, while domain 2, 514b, is associated with package 510a and package 510b. In at least some cases, a domain 514 can specify which packages 510 may use the domain. For instance, it may be that a domain 514 associated with materials used in a manufacturing process can be used by a process-control application, but not by a human resources application.

In at least some implementations, although multiple packages 510 can access a domain 514 (and database objects that incorporate the domain), a domain (and optionally other database objects, such as tables 518, data elements 522, and fields 526, described in more detail below) is primarily assigned to one package. Assigning a domain 514, and other database objects, to a unique package can help create logical (or semantic) relationships between database objects. In FIG. 5, an assignment of a domain 514 to a package 510 is shown as a solid line, while an access permission is shown as a dashed line. So, domain 514a is assigned to package 510a, and domain 514b is assigned to package 510b. Package 510a can access domain 514b, but package 510b cannot access domain 514a.

Note that at least certain database objects, such as tables 518, can include database objects that are associated with multiple packages. For example, a table 518, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 514 (that is, the domains can provide further semantic context for database objects that are associated with an object of another package, rather than being assigned to a common package).

As will be explained in more detail, a domain 514 can represent the most granular unit from which database tables 518 or other schema elements or objects can be constructed. For instance, a domain 514 may at least be associated with a datatype. Each domain 514 is associated with a unique name or identifier, and is typically associated with a description, such as a human readable textual description (or an identifier than can be correlated with a human readable textual description) providing the semantic meaning of the domain. For instance, one domain 514 can be an integer value representing a phone number, while another domain can be an integer value representing a part number, while yet another integer domain may represent a social security number. The domain 514 thus can help provide common and consistent use (e.g., semantic meaning) across the schema 500. That is, for example, whenever a domain representing a social security number is used, the corresponding fields can be recognized as having this meaning even if the fields or data elements have different identifiers or other characteristics for different tables.

The schema 500 can include one or more data elements 522. Each data element 522 is typically associated with a single domain 514. However, multiple data elements 522 can be associated with a particular domain 514. Although not shown, multiple elements of a table 518 can be associated with the same data element 522, or can be associated with different data elements having the same domain 514. Data elements 522 can serve, among other things, to allow a domain 514 to be customized for a particular table 518. Thus, the data elements 522 can provide additional semantic information for an element of a table 518.

Tables 518 include one or more fields 526, at least a portion of which are mapped to data elements 522. The fields 526 can be mapped to a schema of a database layer, or the tables 518 can be mapped to a database layer in another manner. In any case, in some embodiments, the fields 526 are mapped to a database layer in some manner. Or, a database schema can include semantic information equivalent to elements of the schema 500, including the domains 514.

In some embodiments, one or more of the fields 526 are not mapped to a domain 514. For example, the fields 526 can be associated with primitive data components (e.g., primitive datatypes, such as integers, strings, Boolean values, character arrays, etc.), where the primitive data components do not include semantic information. Or, a database system can include one or more tables 518 that do not include any fields 526 that are associated with a domain 514. However, the disclosed technologies can include a schema 500 (which can be separate from, or incorporated into, a database schema) that includes a plurality of tables 518 having at least one field 526 that is associated with a domain 514, directly or through a data element 522.

Example 7—Example Data Dictionary Components

Schema information, such as information associated with the schema 500 of FIG. 5, can be stored in a repository, such as a data dictionary. In at least some cases the data dictionary is independent of, but mapped to, an underlying relational database. Such independence can allow the same database schema 500 to be mapped to different underlying databases (e.g., databases using software from different vendors, or different software versions or products from the same vendor). The data dictionary can be persisted, such as being maintained in stored tables, and can be maintained in memory, either in whole or part. An in-memory version of a data dictionary can be referred to as a dictionary buffer.

Figure 6:
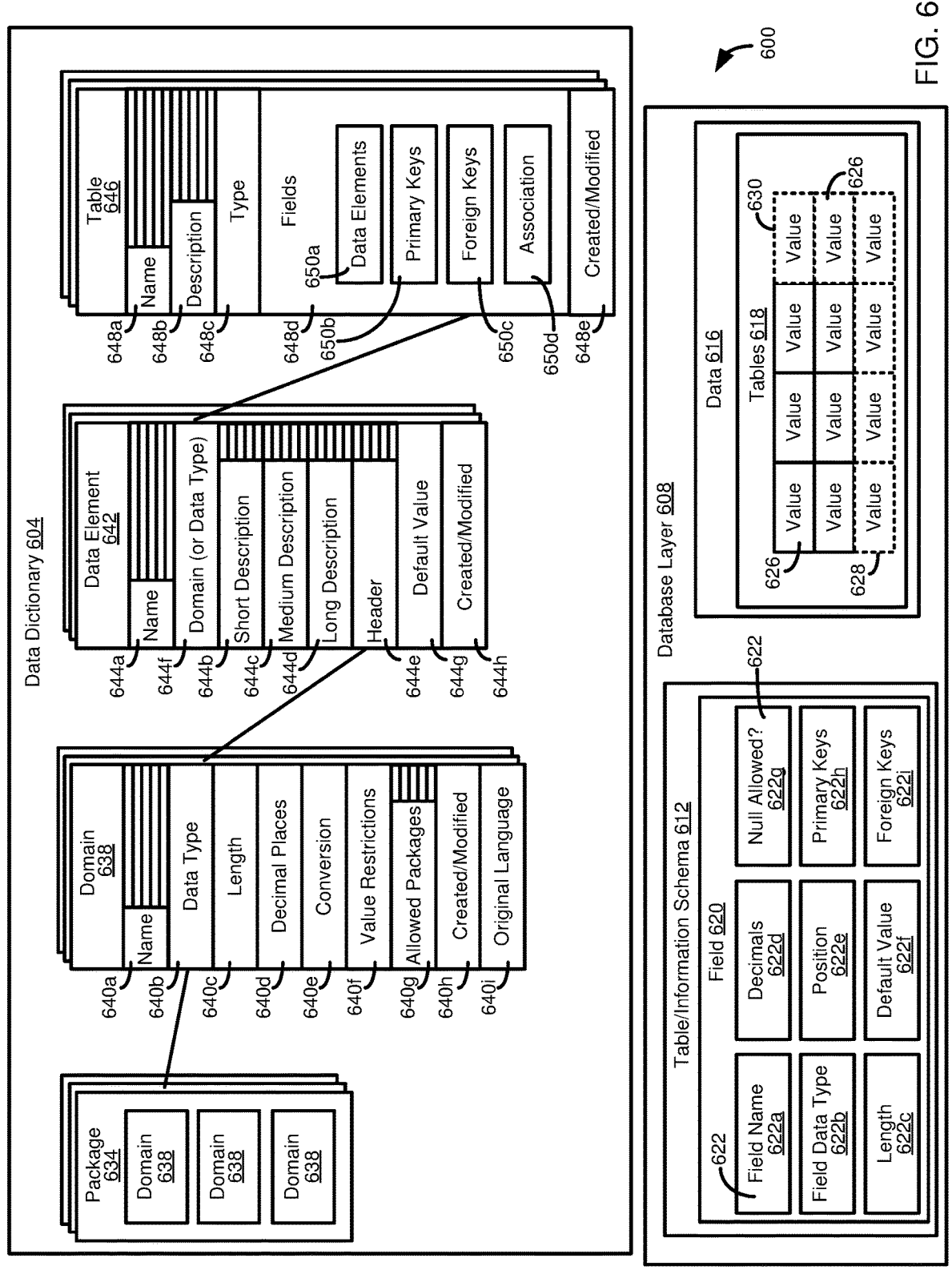
FIG. 6 a schematic diagram illustrating components of a data dictionary and components of a database layer.

FIG. 6 illustrates a database environment 600 having a data dictionary 604 that can access, such as through a mapping, a database layer 608. The database layer 608 can include a schema 612 (e.g., an INFORMATION_SCHEMA as in PostgreSQL) and data 616, such as data associated with tables 618. The schema 612 includes various technical data items/components 622, which can be associated with a field 620, such as a field name 622a (which may or may not correspond to a readily human-understandable description of the purpose of the field, or otherwise explicitly describe the semantic meaning of values for that field), a field data type 622b (e.g., integer, varchar, string, Boolean), a length 622c (e.g., the size of a number, the length of a string, etc., allowed for values in the field), a number of decimal places 622d (optionally, for suitable datatypes, such as, for a float with length 6, specifying whether the values represent XX.XXXX or XXX.XXX), a position 622e (e.g., a position in the table where the field should be displayed, such as being the first displayed field, the second displayed field, etc.), optionally, a default value 622f (e.g., "NULL," "0," or some other value), a NULL flag 622g indicating whether NULL values are allowed for the field, a primary key flag 622h indicating whether the field is, or is used in, a primary key for the table, and a foreign key element 622i, which can indicate whether the field 620 is associated with a primary key of another table, and, optionally, an identifier of the table/field referenced by the foreign key element. A particular schema 612 can include more, fewer, or different technical data items 622 than shown in FIG. 6.

The tables 618 are associated with one or more values 626. The values 626 are typically associated with a field 620 defined using one or more of the technical data elements 622. That is, each row 628 typically represents a unique tuple or record, and each column 630 is typically associated with a definition of a particular field 620. A table 618 typically is defined as a collection of the fields 620, and is given a unique identifier.

The data dictionary 604 includes one or more packages 634, one or more domains 638, one or more data elements 642, and one or more tables 646, which can at least generally correspond to the similarly titled components 510, 514, 522, 518, respectively, of FIG. 5. As explained in the discussion of FIG. 5, a package 634 includes one or more (typically a plurality of) domains 638. Each domain 638 is defined by a plurality of domain elements 640. The domain elements 640 can include one or more names 640a. The names 640a serve to identify, in some cases uniquely, a particular domain 638. A domain 638 includes at least one unique name 640a, and may include one or more names that may or may not be unique. Names which may or may not be unique can include versions of a name, or a description, of the domain 638 at various lengths or levels of detail. For instance, names 640a can include text that can be used as a label for the domain 638, and can include short, medium, and long versions, as well as text that can be specified as a heading. Or, the names 640a can include a primary name or identifier and a short description or field label that provides human understandable semantics for the domain 638.

In at least some cases, the data dictionary 604 can store at least a portion of the names 640a in multiple languages, such as having domain labels available for multiple languages. In embodiments of the disclosed technologies, when domain information is used for identifying relationships between tables or other database elements or objects, including searching for particular values, information, such as names 640a, in multiple languages can be searched. For instance, if "customer" is specified, the German and French portion of the names 640a can be searched as well as an English version.

The domain elements 640 can also include information that is at least similar to information that can be included in the schema 612. For example, the domain elements 640 can include a data type 640b, a length 640c, and a number of decimal places 640d associated with relevant data types, which can correspond to the technical data elements 622b, 622c, 622d, respectively. The domain elements 640 can include conversion information 640e. The conversion information 640e can be used to convert (or interconvert) values entered for the domain 638 (including, optionally, as modified by a data element 642). For instance, conversion information 640e can specify that a number having the form XXXXXXXXX should be converted to XXX-XX-XXXX, or that a number should have decimals or commas separating various groups of numbers (e.g., formatting 1234567 as 1,234,567.00). In some cases, field conversion information for multiple domains 638 can be stored in a repository, such as a field catalog.

The domain elements 640 can include one or more value restrictions 640f. A value restriction 640f can specify, for example, that negative values are or are not allowed, or particular ranges or threshold of values that are acceptable for a domain 638. In some cases, an error message or similar indication can be provided as a value is attempted to be used with a domain 638 that does not comply with a value restriction 640f. A domain element 640g can specify one or more packages 634 that are allowed to use the domain 638.

A domain element 640h can specify metadata that records creation or modification events associated with a domain element 638. For instance, the domain element 640h can record the identity of a user or application that last modified the domain element 640h, and a time that the modification occurred. In some cases, the domain element 640h stores a larger history, including a complete history, of creation and modification of a domain 638.

A domain element 640i can specify an original language associated with a domain 638, including the names 640a. The domain element 640i can be useful, for example, when it is to be determined whether the names 640a should be converted to another language, or how such conversion should be accomplished.

Data elements 642 can include data element fields 644, at least some of which can be at least generally similar to domain elements 640. For example, a data element field 644a can correspond to at least a portion of the name domain element 640a, such as being (or including) a unique identifier of a particular data element 642. The field label information described with respect to the name domain element 640a is shown as separated into a short description label 644b, a medium description label 644c, a long description label 644d, and a header description 644e. As described for the name domain element 640a, the labels and header 644b-644e can be maintained in one language or in multiple languages.

A data element field 644f can specify a domain 638 that is used with the data element 642, thus incorporating the features of the domain elements 640 into the data element. Data element field 644g can represent a default value for the data element 642, and can be at least analogous to the default value 622f of the schema 612. A created/modified data element field 644h can be at least generally similar to the domain element 640h.

Tables 646 can include one or more table elements 648. At least a portion of the table elements 648 can be at least similar to domain elements 640, such as table element 648a being at least generally similar to domain element 640a, or data element field 644a. A description table element 648b can be analogous to the description and header labels described in conjunction with the domain element 640a, or the labels and header data element fields 644b-644e. A table 646 can be associated with a type using table element 648c. Example table types include transparent tables, cluster tables, and pooled tables, such as used as in database products available from SAP SE of Walldorf, Germany.

Tables 646 can include one or more field table elements 648d. A field table element 648d can define a particular field of a particular database table. Each field table element 648d can include an identifier 650a of a particular data element 642 used for the field. Identifiers 650b-650d, can specify whether the field is, or is part of, a primary key for the table (identifier 650b), or has a relationship with one or more fields of another database table, such as being a foreign key (identifier 650c) or an association (identifier 650d).

A created/modified table element 648e can be at least generally similar to the domain element 640h.

Example 8—Example Metadata Model

FIG. 7 illustrates a definition of a metadata model 700. The metadata model 700, in particular, represents a view, such as a Core Data Services view of SAP SE, of Walldorf, Germany, and be expressed in a format such as CSN. The metadata model 700 can include a variety of different components, at least some of which can be considered to be metadata models. That is, the metadata model 700 can be a model that is based at least in part on multiple sub-models. The sub-models can specify particular aspects of the overall metadata model 700.

The metadata model 700 can optionally include one or more annotations 704. An annotation can be a metadata component that can be added to a metadata model. For example, a provider may supply a base model, and individual users or customers may wish to add metadata that is specific to their operating environment and use cases. The ability to add annotations can thus enhance usability by allowing for custom metadata elements, without impacting other users of a base metadata model. Annotations can be specified for different software layers or frameworks.

In the example shown, annotations 704 can be indicated as annotations using particular syntax elements, such as by preceding an annotation with the "@" symbol. In at least some cases, annotations 704 can also be indicated by placing them in the appropriate portion of a metadata model, such as in a header section or another section designated for annotations. In some cases, annotations 704 can reference other metadata models, such as a metadata model of a data source, or can reference a data source that is associated with a metadata model. In either event, such an association 704 can create a dependency between the metadata model 700 and the other metadata model/data source.

The metadata model 700 can include instructions 708, in this case a SQL statement 710, defining a core metadata model/object having an identifier 712 (which can be used, for example to later access or activate, such as to instantiate, the metadata model). In particular, the instructions 708 shown define a view. The annotations 704 further specify properties of the view, as do other portions of the metadata model 700 that will be further described.

The instructions 708 can specify one or more data sources 716. Data sources 716 can define data to which at least a portion of the metadata of the metadata model 700 will apply, and can also supply additional metadata for the metadata model 700. Note that the metadata model 700 can be, in at least a sense, dependent on referenced data sources 716. For example, if the metadata model 700 relies on particular expected data or metadata of a data source 716, the metadata model may be unusable, have performance issues, or provide incorrect results if the referenced data sources do not include expected data or metadata, or are otherwise inconsistent with how the data source is used in the metadata model. As shown, the data sources 716 includes two tables, "vbak" and "vbkd." These tables will typically include metadata features such as one or more fields, where each field is associated with a data type, designations of a primary key, and optionally associations with other database components, such as association or foreign key relationships with other database tables.

The metadata model 700 can optionally include specifications of one or more associations 720. An association 720 can define a relationship to another entity. An association 720 can be processed during the use of the metadata model 700, such as being converted to a SQL expression such as a JOIN. Unlike other conditions or elements that are included in the metadata model 700, associations can define a relationship that can at least in some cases be optional, such as being selectively activated depending upon how the metadata model is accessed. For example, an association 720 can be converted to a JOIN condition that uses a table provided in a SELECT statement that references the metadata model 700.

The metadata model 700 can include one or more components 722 that specify how data retrieved using the metadata model should be processed, including to generate values that are associated with other metadata elements of the metadata model. Processing can include calculating values, such as using a formula specified in, or referenced by, the metadata model 700. In particular, a processing component 722 can specify that a particular field value should be treated as an element 724, where an element can be as described in Examples 6 and 7. Thus, the metadata model 700 can include dependencies on how elements are defined, and the metadata model 700 may not be accurate, or useable, if the element definition does not match how it is used, and intended to be used, in the metadata model 700.

The metadata model 700 can optionally include additional components, such as one or more conditions 728, or other operations, such as aggregations, unions, etc., including such operations that are typically supported by a database query language.

Example 9—Example Metadata Model, Including Relationships with Other Metadata Models FIG. 8 illustrates how metadata models may have dependencies on other metadata models. In particular, FIG. 8 shows a view metadata model 804, which can be the metadata model 700 of FIG. 7. FIG. 8 also illustrates a metadata model 808 for an access control object (such as a DCLS, or data control language source), a metadata model 812 for a metadata extension object (such as a DDLX, or metadata extension), and a metadata model 816 for an extension element object (such as a DDLS, or data definition language source).

The access control object metadata model 808 can be used for restricting access to data that can be retrieved using the view metadata model 804. For example, the view metadata model 804 and the access control object metadata model 808 can be processed together when the view metadata model 804 is activated, such as to generate SQL commands that retrieve data for the view metadata model, but which are filtered or restricted based on the access control object metadata model. As the access control object metadata model 808 references the view metadata model 804, the access control object metadata model depends on the view existing, and on the view containing elements specified in the access control object metadata model. For example, the access control object metadata model references the "SalesOrderType" element of the view "I_SampleSalesOrder" and the authorization object "V_VBAK_AAT" with its authorization field "AUART". Thus, the first element would be undefined or unusable if the corresponding element did not exist in the view metadata model 804.

The metadata extension object metadata model 812 (which adds annotations to the view metadata model 804) has similar dependencies on the view metadata model, as does the extension element object metadata model 816 (which adds additional elements to the view metadata model).

Example 10—Example Relational Model of Metadata Models

Figure 9:
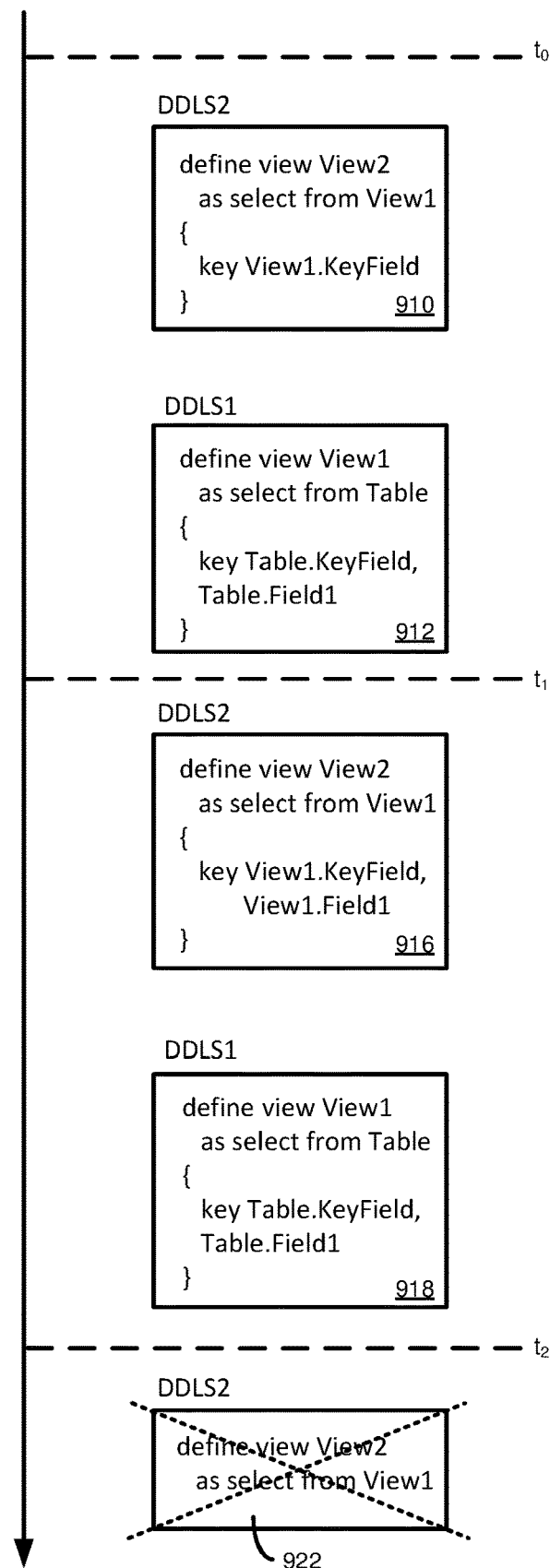
FIG. 9 is a schematic diagram illustrating how metadata models can be interrelated, and updated or deleted, including by multiple computing systems.

FIG. 9 illustrates how metadata models may be dependent on one another, and can be changed over time, which can affect the use or validity of dependent metadata models. At time $t_0$, data definition language versions of metadata models are provided. The metadata models are for two database objects, a model 910 for a View1 and a model 912 for a View2. The model 912 for View2 references View1, as it contains a SQL select statement that defines a particular subset of data defined by the model 910 for View1. Thus, the model 910 includes a dependency on the model 912. In particular, the model 910 depends on View1 existing, and there being a field "KeyField" in View 1.

At time $t_1$, a model 916 for a second version of View2 is received. Compared with the model 912, the model 916 includes another field, Field1, of View1, in the definition of View2. In some cases, the model 916 can be provided as a complete model, while in other cases only changes compared with a prior model version are sent.

At a time $t_2$, the second system uploads an indication 922 that View2 was deleted. Note that, in this case, the deletion of View2 does not affect any described metadata model, as View2 depended on View1, but View1 did not depend on View2. If, instead, View1 had been deleted at time $t_2$, it could be determined that deleting View1 would create issues with View2.

Figure 10A:
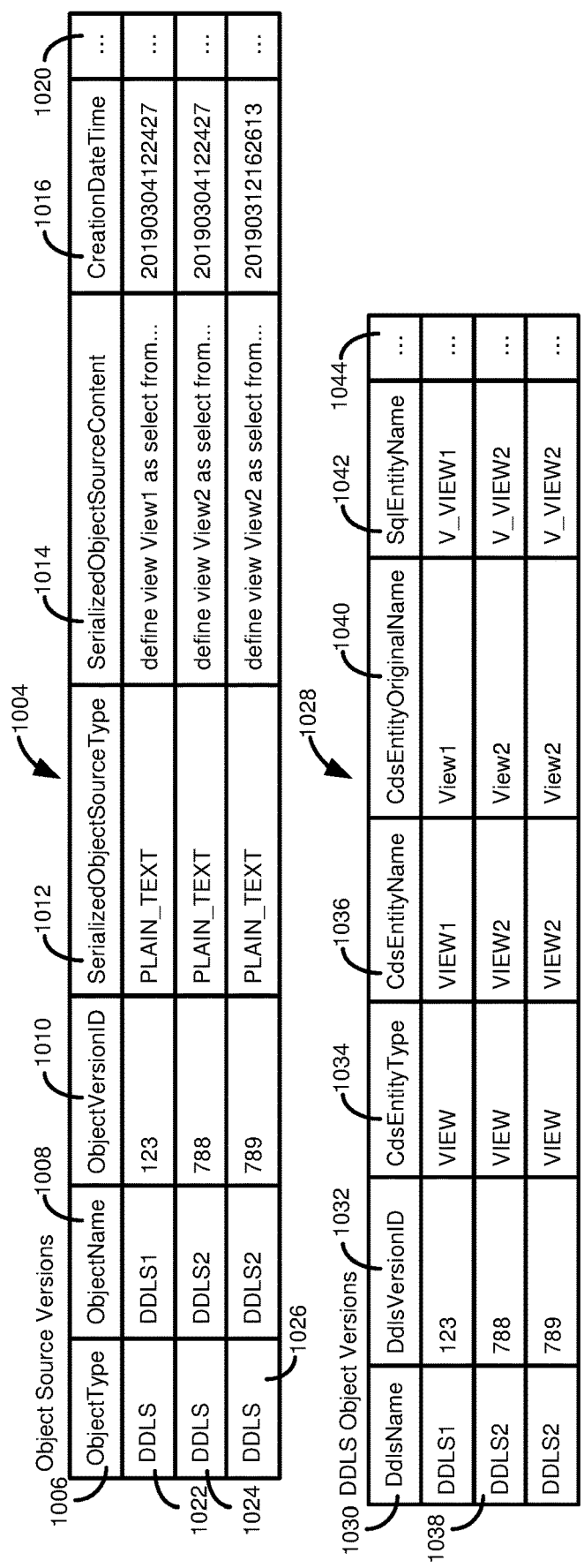
FIGS. 10A and 10B are example tables illustrating how metadata models can be stored in a relational format.
Figure 10B:
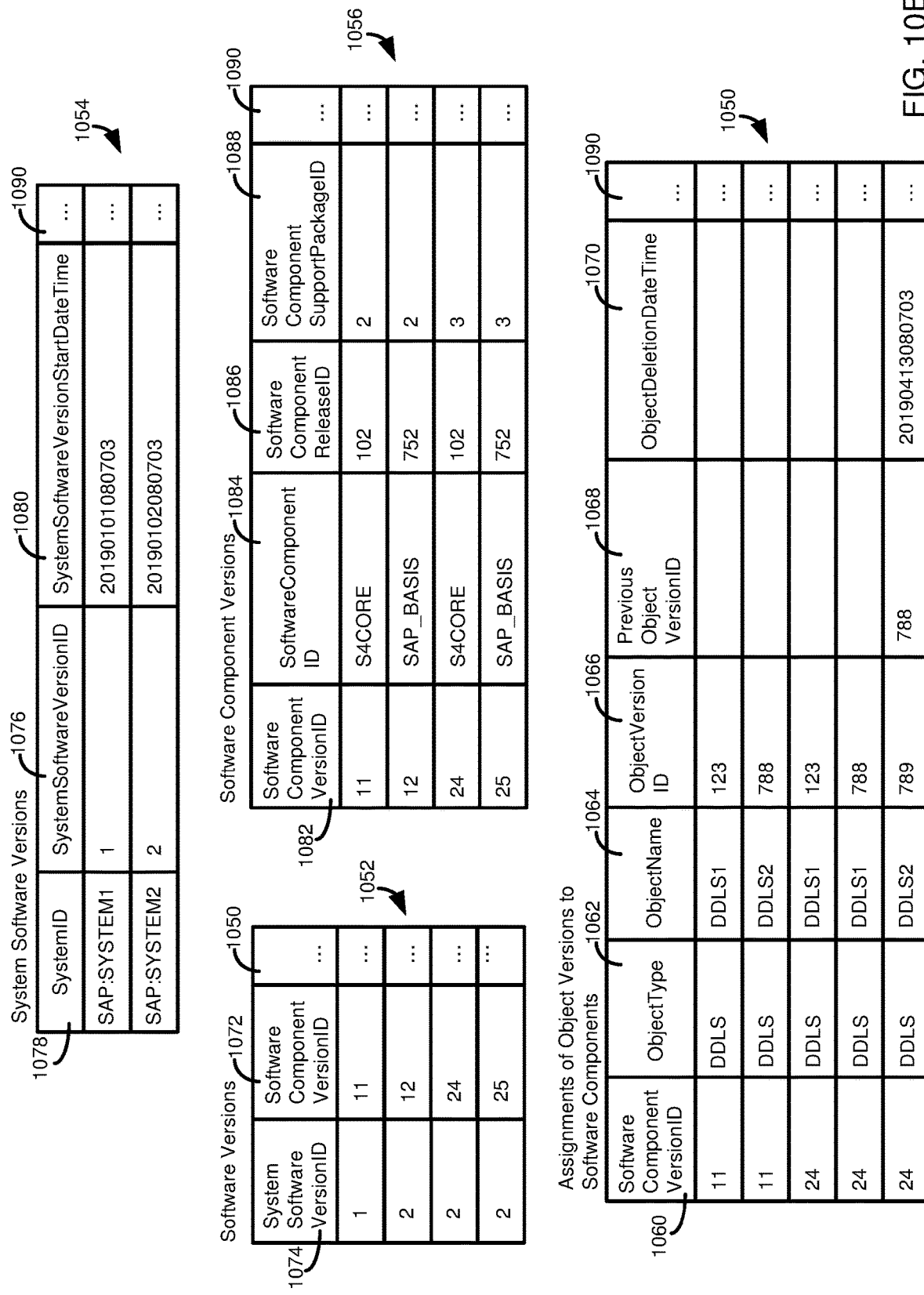

FIG. 9 illustrates the metadata models as defined in a first format, such as a SQL statement defining the views. FIGS. 10A and 10B illustrates how the metadata models shown in FIG. 9 can be converted to a different format, such records in a collection of database tables used to store representations of metadata models. In particular, FIG. 10A shows a table 1004 that includes a field 1006 for an object type associated with a record of the table, a field 1008 holding a name of the object, a field 1010 holding a version identifier associated with the object, a field 1012 providing a type associated with an original format in which the corresponding metadata model was received (e.g., plain text, JSON, XML, CSN, etc.), a field 1014 holding a listing of the original source content (in the type associated with the field 1012), and a field 1016 that includes a timestamp of when the object was received (e.g., with reference to FIG. 9, a timestamp associated with time $t_0$, $t_1$, or $t_2$). The table 1004 can optionally include one or more additional fields 1020.

It can be seen that the table 1004 includes a record 1022 for View1, received at $t_0$, a record 1024 for the metadata model of View2 received at $t_0$, and a record 1026 for the metadata model of View2 received at $t_1$. Note that table 1004 can include information for object source versions, and so type, name, and version information (i.e., fields 1006, 1008, 1010) can be specific for the object as an object source (e.g., a data definition language source, or DDLS).

A table 1028 can include fields for data definition language object versions, which can include a field 1030 for a DDLS name and a field 1032 for a DDLS version identifier, which fields can correspond to the fields 1008, 1010 of the table 1004. The table 1028 can further include a field 1034 that describes an entity (e.g., metadata model) type associated with the corresponding metadata model. Examples of entity types can be table, view, access control, annotation extension, metadata extension, etc.

A field 1036 can include an entity name or identifier, which can be a name or identifier assigned to the metadata model in the declaration of the metadata model, such as in the SQL statements shown in FIG. 9. For example, FIG. 9 shows metadata model 910 as defining a VIEW1, which then supplies the type indicated in field 1034, and the name entered in field 1036 indicated for a record 1038. Note that field 1036 can be a canonical form of the name of the metadata model, and the original name, supplied in the metadata model definition, can be included in a field 1040. Similarly, the canonical name of field 1036 can be associated with other formats, such as a format provided in a field 1042, which, as shown, can be a name used in SQL queries for the metadata model, which can correspond to a name of the metadata model used in a database layer, such as in an information schema. The table 1028 can include one or more additional fields 1044.

As shown in FIG. 10A, all of the information for the metadata models provided at $t_0$ and $t_1$ in FIG. 9 can be retrieved from the tables 1004, 1028, either from individual fields or from the field 1014 with the original source content. FIG. 10B illustrates tables 1050, 1052, 1054, 1056, which can store additional information about the metadata models, including about the systems from which the metadata models, or updates (including deletions) were received. In particular, table 1050 can be used to associate metadata models with software component version identifiers, which can be used to describe the operating environment on the system from which the metadata model was received. Table 1050 includes a field 1060 for the software component version ID associated with the metadata model object name listed in field 1064 (and which corresponds to the field 1008 of table 1004) and the version identifier of field 1066 (which corresponds to the field 1010 of table 1004). A type for the object can be specified in a field 1062.

When a metadata model is changed, the version associated with the identifier in the field 1066 can be linked to a prior version of the metadata model, which can be stored in a field 1068. In the case of a metadata model deletion, a deletion time can be listed in a field 1070 (where no value, or a NULL value, can indicate that the object has not been deleted). In some cases, the deletion field 1070 can be filled out for all versions of the data model. In other cases, the deletion field 1070 is only populated for the last version of the metadata model prior to the deletion.

The table 1052 can associate particular software components, listed in field 1072 (and corresponding to field 1060) with specific system software versions listed in a field 1074. In turn, table 1054 can associate the specific software system versions, in a field 1076, with specific systems indicated by a system identifier in a field 1078, and a timestamp in field 1080 indicating when the system was installed, released, or activated. The table 1056 can include a field 1082 for particular software component versions, corresponding to field 1060 with an identifier of the software component provided in field 1084, a release identifier in field 1086, and a support package identifier in a field 1088. Each of the tables 1050, 1052, 1054, 1056 can optionally include one or more additional fields 1090.

Figure 11:
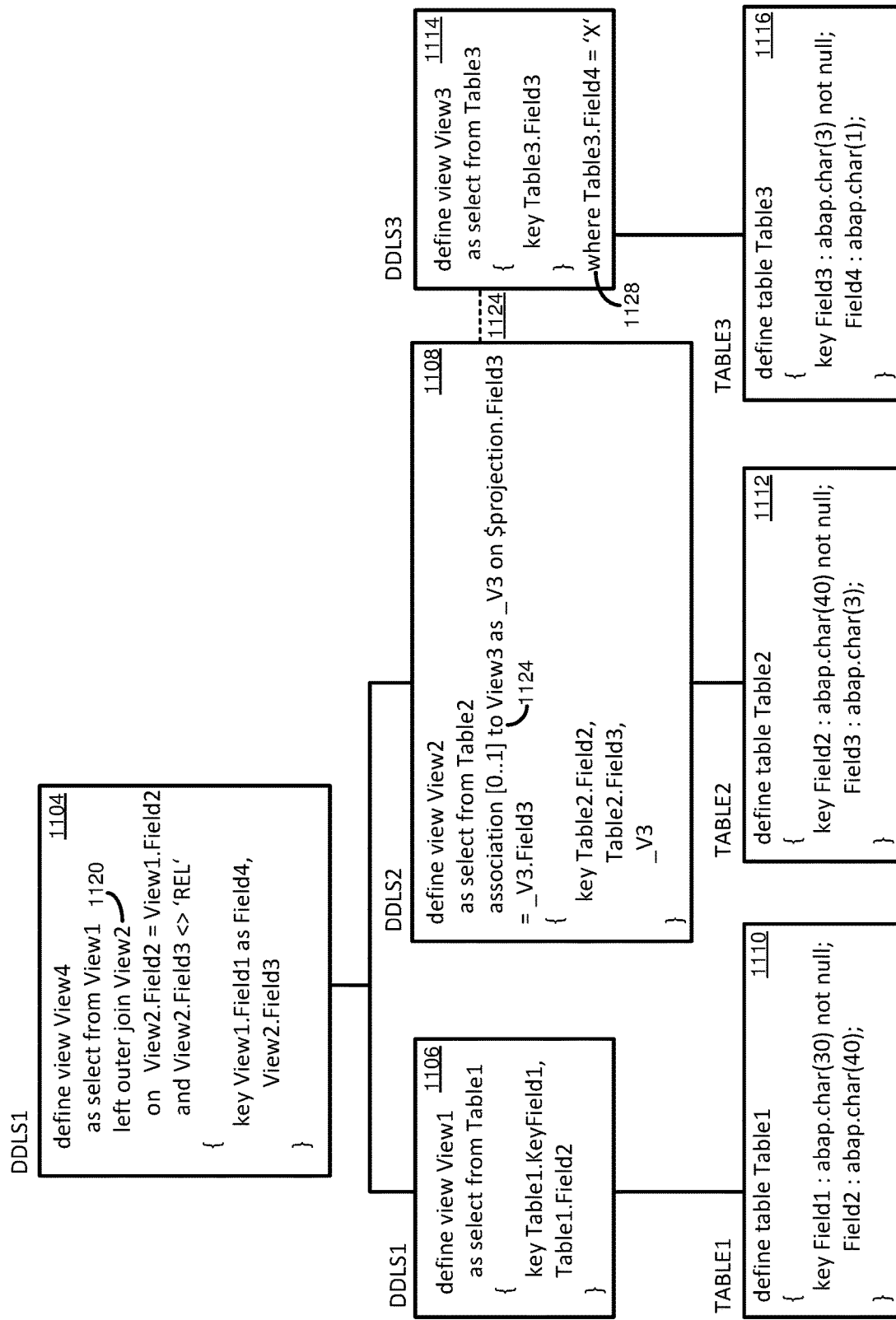
FIG. 11 is a schematic diagram illustrating how metadata models can be interrelated, and can include query operations, such as select statements, join conditions, and where conditions, and how database objects can be related by associations.

Example 11—Example Metadata Relational Model, Including Query Language Operations FIG. 11 illustrates a scenario where a metadata model 1104, in particular, a view, is defined with reference to two view metadata models 1106, 1108, which can in turn depend on one or more additional data models. The metadata model 1106 depends from a metadata model 1110 for a table, while the metadata model 1108 depends from a metadata model 1112 for a table, and has an association with a metadata model 1114 for another view, which in turn references a metadata model 1116 for a table.

The view metadata models 1104, 1106, 1108, 1114 include SQL select statements that can be stored in an alternative format, such as in tabular form, as shown in FIG. 12. The select statements of the view metadata models 1104, 1106, 1108, 1114 of FIG. 11 can include additional features/operations that can be stored in an alternative representation, such as a join condition 1120 in the metadata model 1104, an association 1124 between the metadata model 1108 and the metadata model 1114, and a where condition 1128 in the metadata model 1114.

FIG. 12 illustrates a table 1204 that can store information for metadata models having select statements in tabular format. Table 1204 includes a field 1208 for an object type, which for the metadata models 1104, 1106, 1108, 1114 is a data definition language source object. A field 1210 includes a name or identifier for each record, which can be a system assigned name, or a name used for system purposes, for a given object, such as to uniquely identify each object.

Note that the SQL statements in FIG. 11 do not assign the name used in the field 1210. A field 1212 can store an object version identifier value for the object associated with each record. In some cases, the value stored in the field 1212 can be unique to the given object, and can be incremented when a change is made to the object. For example, record 1216 is shown as having an object version identifier of 56 for the DDLS1 object. If the DDLS1 object is changed again, the object version identifier can be incremented to 57.

The table 1204 can include a field 1220 that stores an entity name, which can be an entity name used in the SQL statements shown in FIG. 11. For example, the metadata model 1104 defines a view View4, which is the name provided in the field 1220 for record 1222, corresponding to View4. In at least some cases, each object in the table 1204 can be associated with a primary data source. For example, a SQL statement can have the form "SELECT FROM primaryDataSource," where the identifier of "primaryDataSource" is stored in the field 1224. For metadata model 1104, View4 is defined primarily with respect to View1, and so View1 is listed in field 1224 for record 1222. The primary data source of field 1224 can have a type, such as table or field, which type is provided in a field 1226.

As described, a select statement used in a metadata model can have additional operations, which can be recorded in the table 1204. If an object metadata model definition includes a where condition, an identifier for that condition can be included in a field 1228. Metadata model 1114 includes where condition 1128, and so an identifier for that condition can be entered in the field 1228 for record 1222. The identifier in the field 1228 can identify a particular condition collection, where additional information can be included in a condition collection table 1232, as will be further described. Similarly, if an object metadata model definition includes a join condition, an identifier for the condition can be included in a field 1236. The identifier in the field 1234 can identify a condition collection in the table 1232.

The table 1232 allows condition details associated with the select statements in table 1204 to be further detailed. The table 1232 includes an object type field 1238 and an object name field 1240, which can correspond to the fields 1208, 1210 of table 1204. Note that the join condition of metadata model 1104 is represented by records 1244-1248, the "where" condition of metadata model 1114 is represented by record 1250, and the "on" condition of the association of metadata model 1108 is represented by record 1252.

The table 1232 includes a field 1256 for a version identifier of the object listed in the field 1240, and can correspond to the field 1212. A field 1258 includes condition collection identifiers, and can correspond to the fields 1228, 1236. A group ID field 1260 and a grouping ordinal number field 1262 can be used to preserve the semantics of the conditions as originally expressed (e.g., in SQL). For example, the group ID field 1260 can be used to indicate portions of a condition that are associated with a data source indicated in a field 1264. So, record 1244 is associated with a group identifier in field 1260 of 1, as it is associated with a value of VIEW1 in field 1264, while records 1246, 1248 are associated with a group identifier of 2, as both records are both associated with a value of VIEW2 for field 1264. The values of the grouping ordinal number field 1262 can further identify particular semantics for the records 1246, 1248, such as indicating that record 1246 precedes record 1248 in the original select statement. A grouping operator field 1266 can provide an operator that associates records associated with a particular group identifier value of the field 1260.

For a given operator or relation listed in a field 1268, fields 1270, 1264, 1272, 1274 can list a left group identifier, the left data source name, a left field name, and a left value, respectively. Similarly, fields 1276, 1278, 1280, 1282 can provide a right group identifier, a right group source name, a right field name, and a right value, respectively. "Left" and "right" refer to the position of the values with respect to the operator of the field 1268.

It can thus be seen that the records of the table 1232 can be used to reconstitute the operations or conditions of the metadata models in the format shown in FIG. 11. Although the table 1232 may not explicitly list a type of operation or condition, that information can be gathered from the fields 1228, 1236 of the table 1204 (or from the table 1284, as will be further described).

An association definition table 1284 can define associations included in metadata models, such as models provided in the format shown in FIG. 11, and can include an object type field 1286, an object name field 1287, an object version identifier field 1288, and an entity name field 1289, which can be as described for the fields 1208, 1210, 1212, 1220 of table 1204. A field 1290 can store a standardized version of an object identifier (e.g., an identifier of an object metadata model) listed in a field 1292, which can be the object name as included in the association definition in the original metadata model, such as the association 1124. A field 1294 can provide a name of the associated entity, and a type associated with the entity (e.g., table, view) can be provided in a field 1295. An association can be associated with a minimum cardinality and a maximum cardinality, fields 1296 and 1297, respectively. A field 1298 can include a condition collection identifier, which can correspond to the field 1258 of the table 1232.

Taking the example association 1124 of FIG. 11, the record 1252 sets forth the condition defined for the association (i.e., the "on" condition). For example, values in a FIELD3 of the table referenced by the view 1108 being defined being equal to a FIELD3 of the associated view defined in metadata model 1114, which in turn are associated with the table defined in metadata model 1116.

The tables 1204, 1232, 1284 can optionally include one or more additional fields 1299.

Example 12—Example Relational Metadata Model, Including Field Definitions and Relations In some cases, a metadata object, such as a view, can include fields that are calculated or otherwise based at least in part on elements (e.g., fields) of one or more other metadata models. The calculations can be explicitly specified in the metadata model definition, or can be referenced in the model definition, such as by calling in a built in function or referencing a function in another metadata model, in a library, an API call, etc.

FIG. 13 illustrates a metadata model 1304 that defines a view with reference to a metadata model 1308, that in turn references a table defined by a metadata model 1312. The metadata model 1304 includes four fields, 1320, 1322, 1324, 1326 that are derived from fields in the metadata model 1308. The metadata model 1308 includes three fields 1330, 1332, 1334 that are selected from the table defined by the metadata model 1312. The table defined by the metadata model 1312 includes three fields 1340, 1342, 1344 that are declared/defined in that metadata model.

FIG. 14 illustrates a table 1400 that can be used to summarize the fields used in the metadata models 1304, 1308, 1312. The table 1400 includes a field 1402 that indicates the type of object with which the field is associated, such as being associated with a table or a data definition language source object (e.g., a view). A name of the object is provided in a field 1404, which can be an object name used by, or supplied by, a system with which the metadata model is used, or, for example, by a metadata service. A version identifier for the object can be provided in a field 1406, which, as discussed for other metadata model representations, can be a unique number for each object, and can be incremented as the object is changed. An entity name field 1408 can include a name that is associated with the metadata model, such as a name that is defined in the declaration of the metadata model.

Each metadata object can be associated with one or more fields, and a field 1410 can store a standardized representation of a field name provided in a field 1412. For example, the field 1410 can store a name that removes formatting/capitalization (e.g., lower case letters) from the field name listed in the field 1412. As described, metadata models may incorporate fields from other metadata models. The immediate source of the field can have a name, provided in a field 1414, and can have a type, such as a table or view, and this type can be provided in a field 1416. The name of the field in the immediate source can be different than the name of the field in the metadata model into which it is incorporated, so a field 1418 can include the name of the field in the source metadata model.

Calculated fields can be associated with an expression, and an identifier for the expression can be provided in a field 1420, which can be used to access the expression, such as an expression stored as a representation in one or more other tables. A field 1422 can indicate whether the field is a key field (e.g., a field used in a primary key). Fields can be associated with a data type, which can be listed in a field 1426, and a data type can be associated with additional semantic or technical information, such as in a data element, an identifier for which can be provided in a field 1424. Often, a data type associated with a field 1426 (and in turn with the field 1424) can have a length, such as number of digits or characters that are allowed, and this information can be included in a field 1428.

Numerical fields that allow for the use of decimals can be associated with a value (e.g., a number of decimal places allowed) through a field 1430. Fields 1432, 1434, 1436, 1438 can be used to define where in a source metadata model a definition of the expression appears, such as a start line, start column, end line, and end column, respectively. The table 1400 can optionally include one or more additional fields 1440.

Figure 15:
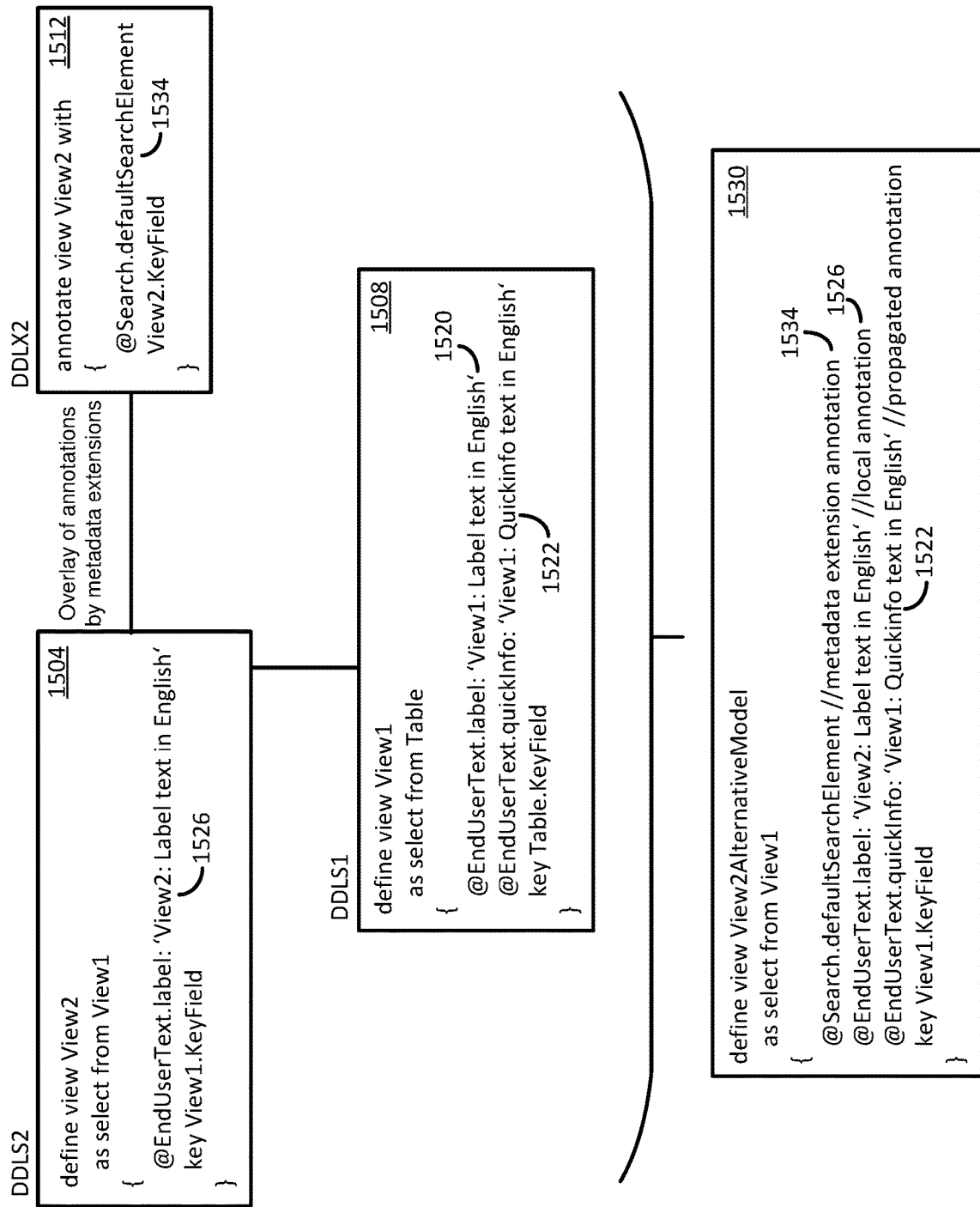
FIG. 15 is a schematic diagram illustrating how metadata models can be related, including metadata models having annotations and metadata models that annotate other metadata models.

As an example of how the table 1404 can be used to represent fields from the metadata models of FIG. 15, consider record 1450, associated with the metadata model 1508. Metadata model 1508 is for a view, VIEW1, and references a Field1 of Table1 (defined by the metadata model 1512), which is a key field. Record 1452 corresponds to the definition of Field1 of Table1 in the metadata model 1512, where Field1 is defined as a key field, that has data element type DE1, and may not be a null value. Record 1450 includes the name of the object, VIEW1, in field 1408, the name, FIELD1, of the field in the object in field 1410, the original name, Field1, of the field in the object in field 1414, the name of the entity where the field is referenced from, TABLE1, in field 1416, the type of the referenced entity, TABL (for table) in field 1416, and the name of the field, FIELD1, in the referenced entity in field 1418. Field 1422 of record 1450 is set to TRUE, indicating that the field associated with record 1450 is a key field, while field 1424 specifies that the field has a data element type of DE1, which fields 1426 and 1428 indicate is a character data type of length 30.

Example 13—Example Relational Metadata Model, Including Annotations

As described in Example 8, a metadata object, such as a view definition, can include annotations. FIG. 15 illustrates how metadata objects, which can have dependencies on one another, can have annotations, which can be stored in another format, such as the format shown in the table 1600 of FIG. 16.

FIG. 15 includes a metadata model 1504 for a view, View2, which is defined with respect to another view, View1, defined in metadata model 1508. A metadata model 1512 for a metadata extension, DDLX2, provides additional metadata elements for the metadata model 1504. The metadata model 1508 includes two annotations, 1520, 1522 that may be incorporated into the metadata model 1504. However, the annotation 1520, which provides a label for View1, is superseded by an annotation 1526 defined in the metadata model 1504 for View2. An annotation can be superseded, in some cases, if the annotation has the same name or type (e.g., "@EndUserText.label" as shown) in the referencing metadata model as in the referenced metadata model.

Metadata model 1530 illustrates an "effective" representation of the metadata model 1504, including annotations incorporated into the metadata model 1504 by dependency. It can be seen that the effective metadata model 1530 includes the annotation 1526, but not the annotation 1520. As the annotation 1522 for the metadata model 1508 is not superseded, it is included in the effective metadata model 1530, as is an annotation 1534 from the metadata model 1512.

The table 1600 of FIG. 16 can summarize the annotations of the metadata models of FIG. 15. The table 1600 includes a field 1604 for an object type associated with the metadata model which is annotated by a record representing an annotation. As shown, the field 1604 includes values of "DDLS" for views, or "DDLX" for metadata extension objects. A field 1608 can provide a name of the object, such as a system name, while a field 1612 can provide an object name defined by the declaration of the object. A field 1610 can provide a version identifier for the object. A field 1614 can provide a name of a subentity associated with an annotation, which can be, for example, a particular view field to which an annotation applies.

A field 1616 can provide an annotation internal identifier, which can be used to distinguish between multiple annotations for a metadata model, and can be used to provide an ordering of annotations when multiple annotations are present in a metadata model. A value of the field 1616 can also be used to correlate a base or parent annotation or annotation type with a sub-annotation, as will be further described. An annotation name can be included in a field 1618, which can be a type (or class) or subtype (or class method or class data member) of an annotation. A field 1620 can provide an identifier for a parent annotation. For example, record 1640 assigned an annotation internal identifier of "1" to the "ENDUSERTEXT" annotation. "ENDUSERTEXT" can be a base annotation type, and record 1642 can include the subtype of the annotation, "ENDUSERTEXT.LABEL," where the value of "1" in field 1620 indicates that the record 1642 refers to the annotation of record 1640.

A value of the annotation as defined in the declaration of the metadata model can be provided in a field 1622. The value in the field 1622 represents the explicitly defined value assigned to the annotation. An effective value assigned to the annotation can be indicated in a field 1624. For example, the annotation @Search.defaultSearchElement has the effective value "TRUE" even though this is not explicitly captured in the declaration of the metadata model but automatically derived from the annotation defaulting logic. Furthermore, in the example shown, the effective value for language dependent texts can be specified with respect to an identifier in a table 1650, where the value in the field 1624 corresponds to a value in a text identifier field 1654. The table 1650 is also shown as including a field 1656 that provides a code for a language associated with the text, and the actual text to be displayed can be provided in a field 1658.

The table 1600 can store information for all annotations that are incorporated into a particular metadata model. However, as described, some of the annotations may not be "active," in that, for instance, a locally declared annotation may overwrite an imported or referenced annotation. Similarly, in some cases annotations from multiple referenced sources (e.g., metadata models) may overlap or conflict, in which case only one (or, generally, a subset) of the annotations may be designated as active. It can be beneficial to separately maintain a repository of active annotations, which can be stored as shown in the table 1700 of FIG. 17.

The table 1700 can include a field 1704 for an object type, a field 1708 for an object name, a field 1710 for an object version identifier, a field 1712 for an entity name, a field 1714 for a subentity name, a field 1716 for an annotation internal identifier, a field 1718 for an annotation name, a field 1720 for a parent annotation identifier, a field 1722 for an annotation value, and a field 1724 for an effective annotation value, which fields can be implemented at least generally described for the similarly titled and numbered fields of the table 1600.

The table 1700 can include additional fields, such as an active annotation version identifier field 1730. Note that the active annotation version identifier in the field 1730 can have a value that is different than the object version identifier in the field 1710. For example, a new metadata extension could change the active annotation of an existing base (e.g., view) model version being annotated, so it may be useful to track the versions separately.

As annotations can be imported from other sources, it can be useful to track information about such annotations with respect to their source object (e.g., metadata model). Accordingly, a field 1732 can store the object type associated with the annotation (either the local object type or the object type of the object from which the annotation is being imported), while a field 1734 can store the name of the originating object. A field 1736 can store the version identifier of the originating object.

Example 14—Example API for Central Metadata Repository

Users or applications can access stored metadata models, such as metadata maintained in one or more of the tabular formats described in Examples 11-13. In some cases, the information can be accessed via an API, such as a web-based API using REST services. In a particular example, the API can use the OData protocol.

Figure 18:
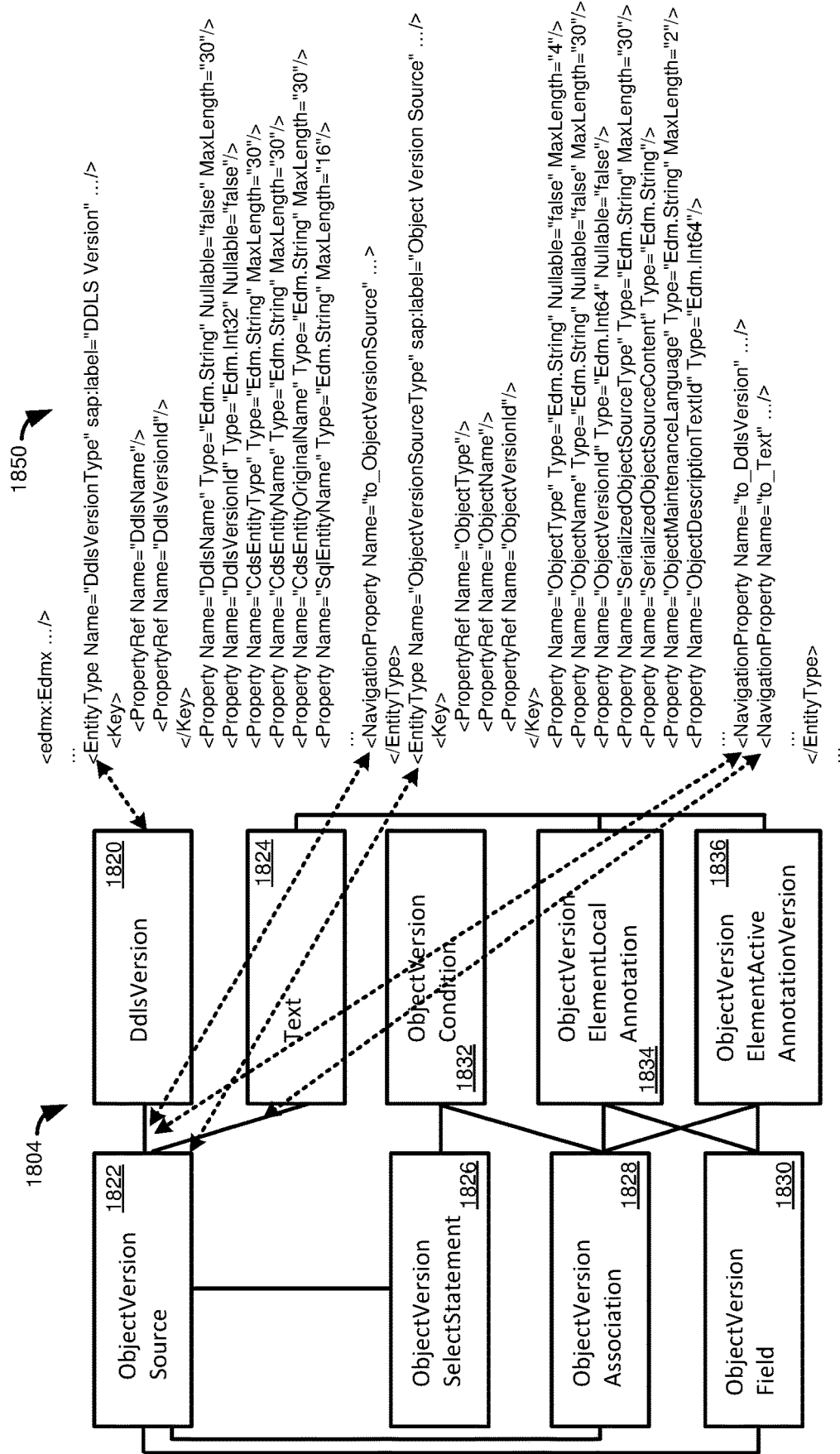
FIG. 18 illustrates code for a data access service that can access a persistency model for metadata models.

FIG. 18 illustrates an extract 1804 of a persistency model (e.g., all or a portion of the tables of Examples 11-14) and an extract 1850 of an OData service that can be used to access data maintained in the persistency, or determined or calculated from data in the persistency. The persistency extract 1804 can include tables, or portions thereof (e.g., one or more fields), for DDLS version information 1820, object version source information 1822, textual information 1824 (e.g., text of original metadata object definition information), select statement information 1826 associated with object versions, association information 1828 associated with object versions, field information 1830 associated with object versions, condition information 1832 associated with object versions (e.g., "where" or "on" conditions, such as described with respect to table 1232), local annotation information 1834 associated with object versions, and active annotation information 1836 associated with object versions.

An API, or other functionality for accessing services of a metadata service, can provide functionality for, among other things, querying and maintaining representations of metadata models, such as to create, update, or delete metadata model representations (or specific versions thereof). The API can allow for other options, such as aggregating data from persisted metadata model representations or searching a metadata repository, including using fuzzy search techniques. For example, a user (or an application) might request information regarding how many objects are registered in a repository, how many versions are associated with a particular object, or a number of fields, that an object may have.

FIG. 19 illustrates an example table 1904 having objection version source information, and an example table 1908 having DDLS version information. The table 1904 can have multiple fields, including a field 1912 for an object type associated with a record, a field 1914 for an object name associated with a record, and a field 1916 for an object version identifier associated with a record. The table 1908 can have a field 1920 for a DDLS name, a DDLS version field 1922, an entity name (such as a CDS entity name) field 1924, and an original entity name field (such as an original CDS entity name) field 1926.

Taking the metadata representations of tables 1904 and 1908 and using the extract 1850, a navigation property of the extract can be traversed to the DDLS version table 1908 from a record of the object version source table 1904 by an OData read request like: . . . /sap/opu/odata/sap/CdsMetadataService/ObjectVersionSource(ObjectType='DDLS', Object Name='I_SALESORDER',ObjectVersionId=1)/ to_DdlsVersion The operation results in the related data record:

```
<?xml version="1.0" encoding="UTF-8"?> ...
<id>.../sap/opu/odata/sap/CdsMetadataService/DdlsVersion(DdlsName='I_SALESORDER',
DdlsVersionId=1)</id> ...
<content type="application/xml">
   <m:properties>
      <d:DdlsName>I_SALESORDER</d:DdlsName>
      <d:DdlsVersionId>1</d:DdlsVersionId>
      ...
```

```
        </m:properties>
    </content> ...
        The API can allow all related information for a given object version to be searched.
    For example, a search request for "cust" can have the form:
    .../sap/opu/odata/sap/CdsMetadataService/Ddls/?search=cust
```

Which retrieves all five records having the DDLS object name (e.g., field 1914) as I_CUSTOMER. Note that a user can retrieve and access metadata information without knowing the exact name of a metadata model or any of its constituent elements.

An API, or other metadata service access functionality, can support other services, including services based on more coarse granular actions than just simply retrieving and updating metadata models. These services can include uploading object source information, comparing metadata models (and parts thereof), including comparing metadata models between different components or system versions. Analysis can be provided of where various metadata models, or elements, are used, including identifying dependencies between metadata models/metadata model components. Providing such services can be more efficient, and less error prone, than achieving the functionality every time through the application of multiple lower level functions.

As an example, for a request to upload a metadata model, instead of converting object source information for each individual table starting with the object version table to tables storing more detailed information, a user or application can request an upload object action, which can supply an original string defining the object (e.g., the original SQL statement), optionally along with additional information, such as the type of the original source string (e.g., SQL, XML, plain text), the name of the object, the object type (e.g., view, table), other information, and combinations thereof. The input can include:
   ObjectType
   ObjectName
   SerializedObjectSourceType
   SerializedObjectSourceContent
   ObjectMaintenanceLanguage
   ObjectLastChangedDateTime
   SoftwareComponentId
   SoftwareComponentReleaseId A metadata repository can be queried to determine whether a new version of the metadata model needs to be created, and, if so, can convert the uploaded model to a persistency format used by the metadata service. In at least some cases, it can be determined whether any metadata models depend on the updated model and, if so, such dependent models can be updated to provide new model versions.

For a function that compares two metadata models, including two versions of a metadata model, information can be provided as to differences between the objects, how metadata models differ between different versions of a software component, or how metadata models differ between two versions of a system. Example input for comparing two versions of a metadata model can include:
   ObjectType
   ObjectName
   ObjectVersion1Id
   ObjectVersion2Id
   ChangeTypes [e.g., change types to be queries, such as all, insert, update, delete, unchanged]
   ComparisionScope [e.g., all elements of a metadata model, or only specified elements or sets of elements]
The comparison can return information including:
   ObjectVersion
   ChangeType
   SubObjectType [e.g., field, association, parameter]
   SubObjectName
   PropertyType [e.g., active annotation, key, data type, name]
   PropertyName
   PropertyValue
The following can represent information in a request for changes in a metadata model:
   Input:
   ChangeTypes=INSERT
   ComparisonScope=ALL
   The response can include:
   Output:
   ObjectVersion=2
   ChangeType=INSERT
   SubObjectType=FIELD
   SubObjectName=NewField
Thus, the comparison request reveals that a new field, NewField, was introduced in object version 2 of the metadata model.

A metadata exposure service or other functionality for accessing a metadata repository can be to return a list of objects where a particular metadata element is used. For example, a field may be initially defined for a particular table, but then may be referenced by multiple views. Input for this functionality can include:
   Input:
   ObjectType: Identification
   ObjectName: Identification
   ObjectVersionId: Identification
   UseageTypes [e.g., ALL, association, target, data source, annotation)
   MaximumNumberOfIndirections
The output of the request can include:
   UsingObjectType
   UsingObjectName
   UsingObjectVersionId
   UsageType
   DirectlyUsedObjectType
   DirectlyUsedObjectName
   DirectlyUsedObjectName
   DirectlyUsedObjectVersionId
   NumberOfIndirections
FIG. 20 provides an example of a "where used" request. A group 2004 of related metadata models includes a metadata model 2008 for a View3 that references a metadata model 2010 for a View2, which references a metadata model 2012 for a View1, which in turn references a metadata model 2014 for a Table1. Assuming that each of the views, 2008, 2010, 2012 references a field of Table1, and that the views refer to this field through their referenced views as shown, a request could be:
   Input:

ObjectName: TABLE1
UseageTypes: ALL
MaximumNumberOfIndirections: 5

In response to the request, the information shown in table 2030 could be provided, either in tabular form as shown, or in another format.

For a dependency check, input (e.g., arguments to the function) can include:
ObjectType
ObjectName
ObjectSourceType
ObjectSourceContent
SoftwareComponentVersions
NewSoftwareComponentVersions A response to the request (e.g., values returned by the function, such as in a structure (e.g., a C++ struct) or class instance, or another complex or abstract data type), can include:
MessageType [e.g., INFO, WARNING, ERROR]
MessageText
EntityReference [e.g., a link to additional details for the metadata model, so that additional information regarding dependent objects can be identified]

As a particular example, consider that a new annotation, NewAnnotation, is added to a field ViewField, which is exposed by a user model. Output for a dependency check can include:
MessageType: INFO
MessageText: A new annotation NewAnnotation was added to the field ViewField
EntityReference= . . . /sap/opu/odata/sap/CdsMetadataService/ . . . NewAnnotation . . .

A service processing access to metadata can cause, or assist, in displaying metadata information to an end user, such on a user interface screen. The service can augment model metadata with additional information that can define the layout of the user interface, and can include or define additional services that allow a user to interact with the data. For example, annotations can be provided that assist a user in providing filter criteria via a value help, as shown in the example code of FIG. 21.

Example 15—Example Implementations

Figure 22:
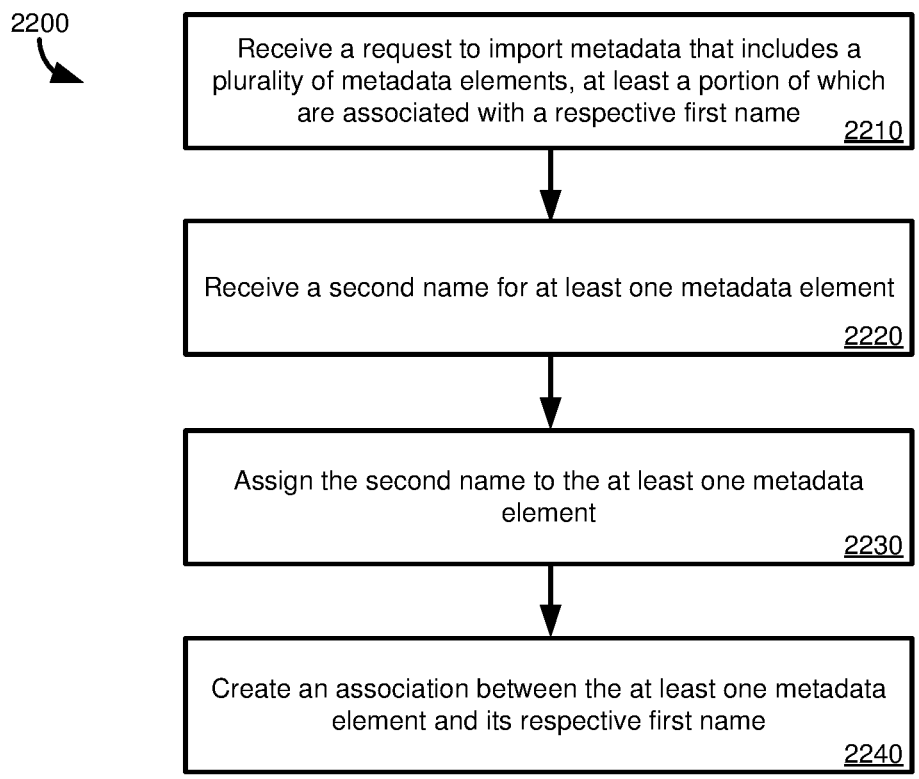
FIG. 22 is a flowchart illustrating an embodiment of disclosed techniques for retaining names for renamed metadata elements.

FIG. 22 provides a flowchart of an example method 2200 for renaming a metadata element yet maintaining an association with an original name for the metadata element. The method 2200 can be implemented in the computing environment 100 of FIG. 1.

At 2210, a request is received to import metadata that includes a plurality of metadata elements, at least a portion of which metadata elements are associated with a respective first name. A second name is received for at least one of the metadata elements at 2220. At 2230, the second name is assigned to the at least one metadata element. An association between the at least one metadata element and its respective first name is created at 2240.

Example 16—Computing Systems

Figure 23:
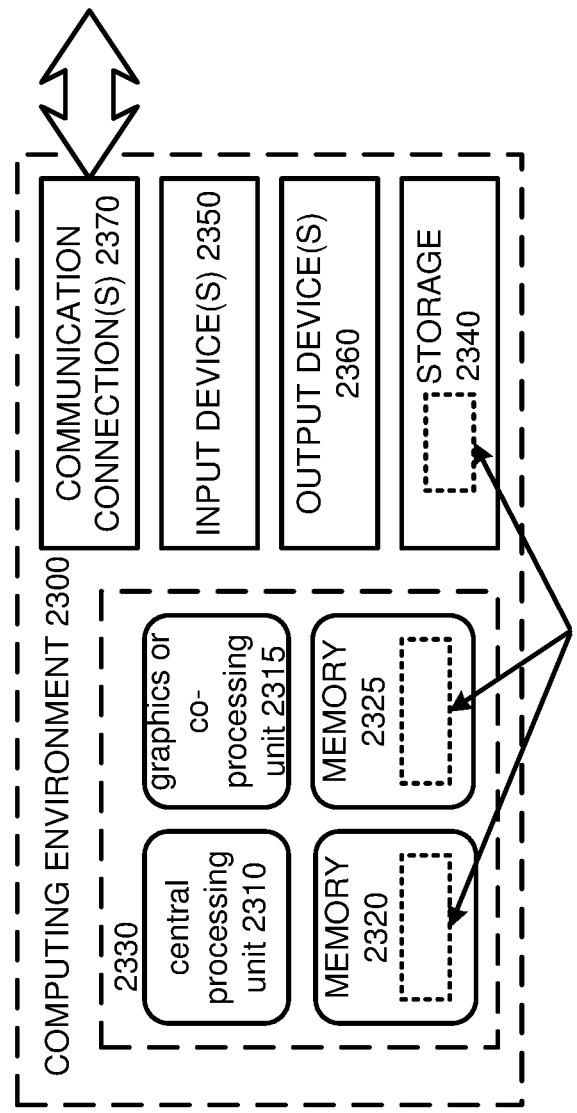
FIG. 23 is a diagram of an example computing system in which some described embodiments can be implemented.

FIG. 23 depicts a generalized example of a suitable computing system 2300 in which the described innovations may be implemented. The computing system 2300 is not intended to suggest any limitation as to scope of use or functionality of the present disclosure, as the innovations may be implemented in diverse general-purpose or special-purpose computing systems.

With reference to FIG. 23, the computing system 2300 includes one or more processing units 2310, 2315 and memory 2320, 2325. In FIG. 23, this basic configuration 2330 is included within a dashed line. The processing units 2310, 2315 execute computer-executable instructions, such as for implementing components of the environment 100 of FIG. 1, including as described in Examples 1-15. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 23 shows a central processing unit 2310 as well as a graphics processing unit or co-processing unit 2315. The tangible memory 2320, 2325 may be volatile memory (e.g., registers, cache, RAM), non-volatile memory (e.g., ROM, EEPROM, flash memory, etc.), or some combination of the two, accessible by the processing unit(s) 2310, 2315. The memory 2320, 2325 stores software 2380 implementing one or more innovations described herein, in the form of computer-executable instructions suitable for execution by the processing unit(s) 2310, 2315.

A computing system 2300 may have additional features. For example, the computing system 2300 includes storage 2340, one or more input devices 2350, one or more output devices 2360, and one or more communication connections 2370. An interconnection mechanism (not shown) such as a bus, controller, or network interconnects the components of the computing system 2300. Typically, operating system software (not shown) provides an operating environment for other software executing in the computing system 2300, and coordinates activities of the components of the computing system 2300.

The tangible storage 2340 may be removable or non-removable, and includes magnetic disks, magnetic tapes or cassettes, CD-ROMs, DVDs, or any other medium which can be used to store information in a non-transitory way, and which can be accessed within the computing system 2300. The storage 2340 stores instructions for the software 2380 implementing one or more innovations described herein.

The input device(s) 2350 may be a touch input device such as a keyboard, mouse, pen, or trackball, a voice input device, a scanning device, or another device that provides input to the computing system 2300. The output device(s) 2360 may be a display, printer, speaker, CD-writer, or another device that provides output from the computing system 2300.

The communication connection(s) 2370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 17—Cloud Computing Environment

Figure 24:
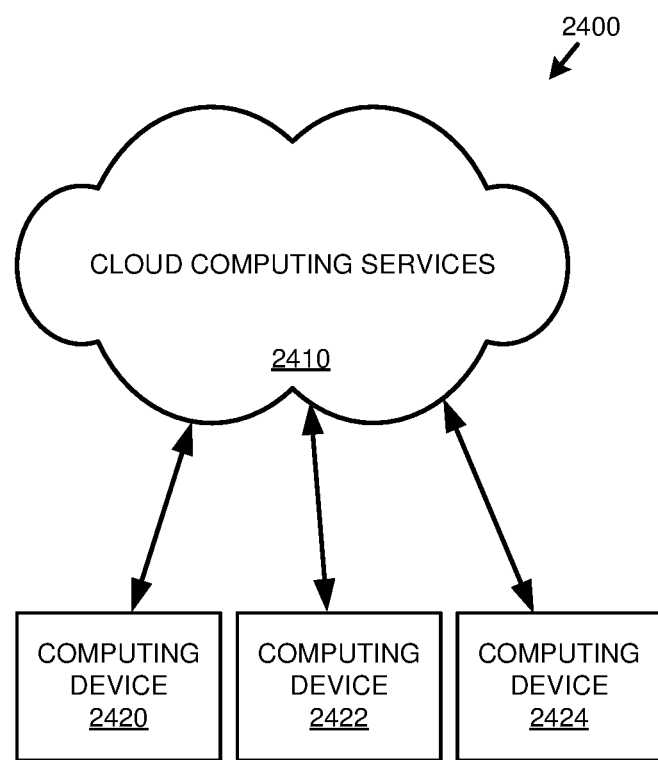
FIG. 24 is an example cloud computing environment that can be used in conjunction with the technologies described herein.

FIG. 24 depicts an example cloud computing environment 2400 in which the described technologies can be implemented. The cloud computing environment 2400 comprises cloud computing services 2410. The cloud computing services 2410 can comprise various types of cloud computing resources, such as computer servers, data storage repositories, networking resources, etc. The cloud computing services 2410 can be centrally located (e.g., provided by a data center of a business or organization) or distributed (e.g., provided by various computing resources located at different locations, such as different data centers and/or located in different cities or countries).

The cloud computing services 2410 are utilized by various types of computing devices (e.g., client computing devices), such as computing devices 2420, 2422, and 2424. For example, the computing devices (e.g., 2420, 2422, and 2424) can be computers (e.g., desktop or laptop computers), mobile devices (e.g., tablet computers or smart phones), or other types of computing devices. For example, the computing devices (e.g., 2420, 2422, and 2424) can utilize the cloud computing services 2410 to perform computing operators (e.g., data processing, data storage, and the like).

Example 18—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 23, computer-readable storage media include memory 2320 and 2325, and storage 2340. The term computer-readable storage media does not include signals and carrier waves. In addition, the term computer-readable storage media does not include communication connections (e.g., 2370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one hardware processor;
at least one memory coupled to the at least one hardware processor; and
one or more computer readable storage media storing computer-executable instructions that, when executed, cause the computing system to perform operations comprising:
storing a definition of a first data artefact, the definition of the first data artefact comprising a first plurality of metadata elements, the first plurality of metadata elements comprising a first metadata element having a first name;
subsequent to the storing the definition of the first data artefact, receiving a request to import metadata of a second data artefact to the first data artefact, the second data artefact having a definition comprising a second plurality of metadata elements, the second plurality of metadata elements comprising a second metadata element having a second name;
determining that (1) the second name is the same as the first name, or (2) determining that the second name is incompatible with a naming convention or a naming constraint;
in response to the determining, generating a modified definition of the first data artefact by modifying the definition of the first data artefact to comprise (1) a metadata element comprising an identifier of the second data artefact; and (2) a metadata element comprising the second name; and
providing an instance of the first data artefact according to the modified definition of the first data artefact.

2. The computing system of claim 1, the operations further comprising:
receiving a request for at least a portion of the metadata elements of the first data artefact; and
returning the first name and the second name in response to the request.

3. The computing system of claim 1, the operations further comprising:
receiving a request for at least a portion of the metadata elements of the first data artefact; and
returning the first name and not the second name in response to the request.

4. The computing system of claim 1, the operations further comprising:
receiving a request for at least a portion of the metadata elements of the first data artefact; and
returning the second name and not the first name in response to the request.

5. The computing system of claim 1, wherein the determining comprises determining that the second name is incompatible with a naming convention or a naming constraint.

6. The computing system of claim 1, wherein the determining comprises determining that the second name is incompatible with a naming convention or a naming constraint, the operations further comprising:
generating a message indicating that the second name is incompatible with the naming convention or naming constraint; and
receiving a third name is in response to the generating a message; and
adding a metadata element to the definition of the first data artefact having the third name.

7. The computing system of claim 1, the operations further comprising:
receiving a request to import metadata of the first data artefact;
receiving a third name for a metadata element of a third data artefact corresponding to the second metadata element;
assigning the third name to the metadata element of the third data artefact; and
storing a reference to the identifier of the second data artefact and the second name in a definition of the third data artefact.

8. The computing system of claim 7, the definition of the third data artefact further comprising an identifier of the first data artefact and the first name.

9. The computing system of claim 1, the operations further comprising:
preventing removal or modification of the identifier of the second data artefact in the modified definition of the first data artefact.

10. The computing system of claim 1, the operations further comprising:
preventing removal or modification of the second name in the modified definition of the first data artefact.

11. The computing system of claim 1, the operations further comprising:
restricting removal or modification of the identifier of the second data artefact in the modified definition of the first data artefact.

12. The computing system of claim 1, the operations further comprising:
restricting removal or modification of the second name in the modified definition of the first data artefact.

13. The computing system of claim 1, the operations further comprising:
receiving a request for metadata elements using the first name or a third name in the modified definition of the first data artefact for a third metadata element of the first data artefact that corresponds to the second metadata element;
determining that the first metadata element in the modified definition of the first data artefact is responsive to the request using the modified definition of the first data artefact; and
returning the first metadata element or the third metadata element of the modified definition of the first data artefact in response to the request for metadata elements.

14. The computing system of claim 1, wherein metadata of the second data artefact is stored on a first computing system and the request to import metadata is sent by a second computing system.

15. The computing system of claim 1, the operations further comprising:
converting metadata of the second data artefact from a first metadata format to a second metadata format, wherein the second name is not compatible with the second metadata format;
generating a third name for the second metadata element in response to determining that the second name is incompatible with the second metadata format; and
adding to the definition of the first data artefact a third metadata element having the third name.

16. One or more computer-readable storage media comprising:
computer-executable instructions that, when executed by a computing system comprising at least one hardware processor and at least one memory coupled to the at least one hardware processor, cause the computing system to store a definition of a first data artefact, the definition of the first data artefact comprising a first plurality of metadata elements, the first plurality of metadata elements comprising a first metadata element having a first name;
computer-executable instructions that, when executed by the computing system, cause the computing system to, subsequent to the storing the definition of the first data artefact, receive a request to import metadata of a second data artefact to the first data artefact, the second data artefact having a definition comprising a second plurality of metadata elements, the second plurality of metadata elements comprising a second metadata element having a second name;
computer-executable instructions that, when executed by the computing system, cause the computing system to determine that (1) the second name is the same as the first name, or (2) determine that the second name is incompatible with a naming convention or a naming constraint;
computer-executable instructions that, when executed by the computing system, cause the computing system to, in response to the determining, generate a modified definition of the first data artefact by modifying the definition of the first data artefact to comprise (1) a metadata element comprising an identifier of the second data artefact; and (2) a metadata element comprising the second name; and
computer-executable instructions that, when executed by the computing system, cause the computing system to provide an instance of the first data artefact according to the modified definition of the first data artefact.

17. A method, implemented in a computing environment comprising a computing system hosting a central metadata repository accessible to a plurality of different client systems, the computing system comprising at least one hardware processor and at least one memory coupled to the at least one hardware processor, the method comprising:
storing a definition of a first data artefact, the definition of the first data artefact comprising a first plurality of metadata elements, the first plurality of metadata elements comprising a first metadata element having a first name;
subsequent to the storing the definition of the first data artefact, receiving a request to import metadata of a second data artefact to the first data artefact, the second data artefact having a definition comprising a second plurality of metadata elements, the second plurality of metadata elements comprising a second metadata element having a second name;
determining that (1) the second name is the same as the first name, or (2) determining that the second name is incompatible with a naming convention or a naming constraint;
in response to the determining, generating a modified definition of the first data artefact by modifying the definition of the first data artefact to comprise (1) a metadata element comprising an identifier of the second data artefact; and (2) a metadata element comprising the second name; and
providing an instance of the first data artefact according to the modified definition of the first data artefact.

18. The computing system of claim 1, the operations further comprising: preventing or restricting removal or modification of the second name or the identifier of the second data artefact in the modified definition of the first data artefact by the second name or the identifier of the second data artefact is associated with an identifier indicating that the second name or the identifier of the second data artefact is associated with a data artefact other than the first data artefact.

19. The method of claim 1, further comprising:
receiving a request for at least a portion of the metadata of the first data artefact; and
returning the first name and the second name in response to the request.

20. The method of claim 1, further comprising:
receiving a request for at least a portion of the metadata of the first data artefact; and
returning the second name and not the first name in response to the request.

* * * * *